United States Patent
Shibata et al.

(10) Patent No.: US 11,897,382 B2
(45) Date of Patent: *Feb. 13, 2024

(54) VEHICLE LAMP SYSTEM, VEHICLE LAMP CONTROL DEVICE AND VEHICLE LAMP CONTROL METHOD

(71) Applicant: KOITO MANUFACTURING CO., LTD., Tokyo (JP)

(72) Inventors: Yoshinori Shibata, Shizuoka (JP); Takao Muramatsu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 17/404,430

(22) Filed: Aug. 17, 2021

(65) Prior Publication Data

US 2021/0370820 A1  Dec. 2, 2021

Related U.S. Application Data

(63) Continuation of application No. 16/479,638, filed as application No. PCT/JP2018/000377 on Jan. 10, 2018, now Pat. No. 11,097,653.

(30) Foreign Application Priority Data

Jan. 20, 2017 (JP) .................. 2017-008585
Jan. 20, 2017 (JP) .................. 2017-008586
(Continued)

(51) Int. Cl.
*B60Q 1/14* (2006.01)
*G06V 10/141* (2022.01)
*G06V 20/56* (2022.01)

(52) U.S. Cl.
CPC .......... *B60Q 1/143* (2013.01); *G06V 10/141* (2022.01); *G06V 20/56* (2022.01); *B60Q 2300/42* (2013.01)

(58) Field of Classification Search
CPC .... B60Q 9/008; B60Q 2300/42; B60Q 1/143; B60Q 1/0023; B60Q 2300/41; B60Q 1/085; B60Q 1/26; B60Q 9/00; B60Q 1/1423

See application file for complete search history.

(56) References Cited

U.S. PATENT DOCUMENTS 9,325,028 B2 * 4/2016 Kwon ............... H01M 10/0436
2003/0123706 A1 * 7/2003 Stam .................... B60Q 1/2603
382/104
(Continued)

FOREIGN PATENT DOCUMENTS

CN 1940711 A 4/2007
CN 104956400 A 9/2015
(Continued)

OTHER PUBLICATIONS

Office Action issued in corresponding Chinese Application No. 201880007626.1, dated Apr. 19, 2022 (31 pages).
Office Action in corresponding European Application No. 19 191 753.3, dated Mar. 13, 2023 (7 pages).

*Primary Examiner* — Wei (Victor) Y Chan
(74) *Attorney, Agent, or Firm* — Osha Bergman Watanabe & Burton LLP

(57) ABSTRACT

A vehicle lamp control device includes: an imaging unit that takes an image ahead of a host vehicle; a target analysis unit that detects target objects ahead of the host vehicle based on the information obtained from an imaging unit configured to take an image ahead of the host vehicle; and a tracking unit that determines a specific target object from the target objects detected by the target analysis unit and to detect displacement of the specific target object based on a detec-
(Continued)

tion result of an luminance analysis unit configured to detect luminance of each of a plurality of individual areas ahead of the host vehicle based on information obtained from the imaging unit. A light distribution pattern to be formed by a light source unit of a vehicle lamp is determined based on the detection result of the luminance analysis unit and a detection result of the tracking unit.

10 Claims, 17 Drawing Sheets

(30) Foreign Application Priority Data

| Feb. 8, 2017 | (JP) | 2017-021543 |
| Feb. 8, 2017 | (JP) | 2017-021544 |
| Jun. 8, 2017 | (JP) | 2017-113719 |
| Oct. 2, 2017 | (JP) | 2017-192575 |

(56) References Cited

U.S. PATENT DOCUMENTS

| 2007/0073484 | A1 | 3/2007 | Horibe |
| 2013/0169155 | A1* | 7/2013 | Nakashima ............ B60Q 1/143 |
| | | | 315/82 |
| 2014/0145612 | A1* | 5/2014 | Takagaki ............... B60Q 1/085 |
| | | | 315/82 |
| 2015/0055357 | A1* | 2/2015 | Nakatani ............... F21S 41/151 |
| | | | 362/466 |
| 2015/0243043 | A1 | 8/2015 | Guan |
| 2018/0180242 | A1* | 6/2018 | Na .......................... F21S 41/43 |
| 2018/0257561 | A1* | 9/2018 | Kapuria ................. G01S 17/931 |

FOREIGN PATENT DOCUMENTS

| CN | 105539272 A | 5/2016 |
| EP | 3647115 A1 | 5/2020 |

* cited by examiner

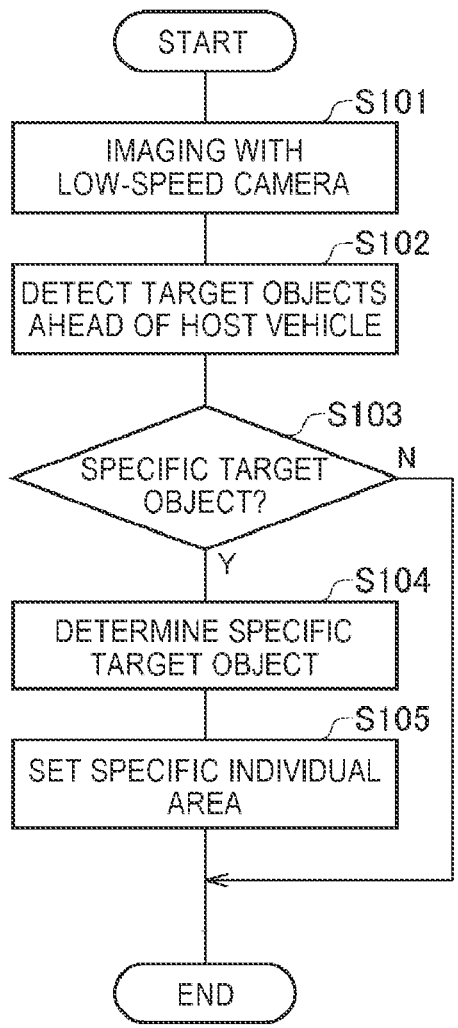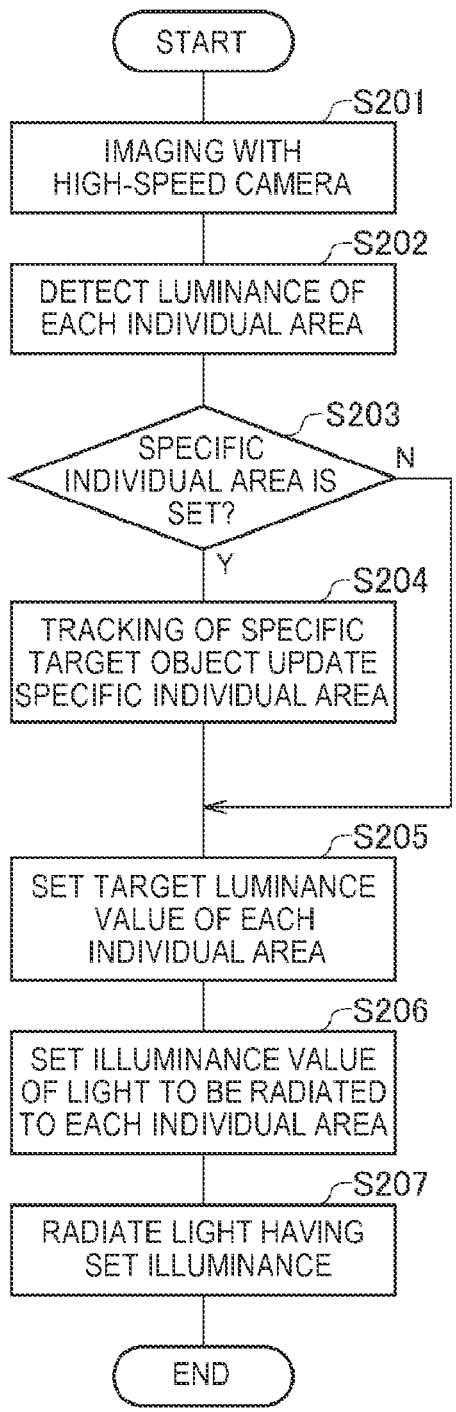

VEHICLE LAMP SYSTEM, VEHICLE LAMP CONTROL DEVICE AND VEHICLE LAMP CONTROL METHOD

CROSS REFERENCE TO RELATED APPLICATIONS

This application is a continuation application of U.S. patent application Ser. No. 16/479,638, filed on Jul. 22, 2019, which is a national stage application of PCT Application No. PCT/JP2018/000377, filed on Jan. 10, 2018, which claims foreign priority to Japanese Patent Applications No. JP2017-192575, filed on Oct. 2, 20117, No. 2017-113719, filed on Jun. 8, 2017, No. 20117-021543, filed on Feb. 8, 20117, 2017-021544, filed on Feb. 8, 2017, No. 2017-008585, filed on Jan. 20, 2017, and No. 2017-008586, filed on Jan. 20, 2017. The entire contents of these applications are incorporated hereby by reference.

BACKGROUND

Technical Field

The present invention relates to a vehicle lamp system, a vehicle lamp control device and a vehicle lamp control method, and particularly, to a vehicle lamp system, a vehicle lamp control device and a vehicle lamp control method to be used for an automobile and the like.

Related Art

There has been known an ADB (Adaptive Driving Beam) control of forming a light distribution pattern according to a position of a vehicle and the like ahead of a host vehicle. For example, Patent Document 1 discloses a technique of executing the ADB control by using a DMD (Digital Mirror Device) which a plurality of micro mirrors are aligned in an array shape. Patent Document 2 discloses a technique of executing the ADB control by using a scan optical system configured to scan an area ahead of the host vehicle with source light. Patent Document 3 discloses a technique of executing the ADB control by using an LED array.

Patent Document 1: JP-A-2015-064964
Patent Document 2: JP-A-2012-227102
Patent Document 3: JP-A-2008-094127

SUMMARY OF INVENTION

Having intensively studied the ADB control, inventors recognized that there is room for further improvement on radiation accuracy or formation accuracy of a light distribution pattern when radiating light according to situations ahead of the host vehicle.

One or more embodiments of the present invention improves radiation accuracy of light or formation accuracy of a light distribution pattern in a vehicle lamp.

One or more embodiments of the present invention provides a vehicle lamp system. The system includes: an imaging unit configured to take an image ahead of a host vehicle; a luminance analysis unit configured to detect luminance of each of a plurality of individual areas ahead of the host vehicle based on information obtained from the imaging unit; a target analysis unit configured to detect target objects ahead of the host vehicle based on the information obtained from the imaging unit; a tracking unit configured to determine a specific target object from the target objects detected by the target analysis unit and to detect displacement of the specific target object based on a detection result of the luminance analysis unit; an illuminance setting unit configured to set, based on the detection result of the luminance analysis unit and a detection result of the tracking unit, an illuminance value of light to be radiated to each individual area, which includes a specific illuminance value for a specific individual area determined according to a position where the specific target object is present; a light source unit capable of individually adjusting the illuminance of the light to be radiated to each of the plurality of individual areas; and a light source control unit configured to control the light source unit based on the illuminance values set by the illuminance setting unit. According to this aspect, it is possible to improve radiation accuracy of light in a vehicle lamp.

In one or more embodiments of the present invention, the imaging unit may include a high-speed camera and a low-speed camera, the luminance analysis unit may be configured to detect the luminance based on information obtained from the high-speed camera, and the target analysis unit may be configured to detect the target objects based on information obtained from the low-speed camera. In the above aspect, the illuminance setting unit may be configured to set a target luminance value of each individual area and set the illuminance value based on the target luminance value, and to set the same target luminance value for individual areas, of which the luminances detected by the luminance analysis unit are within a predetermined range, of the individual areas except the specific individual area. In the above aspect, the illumninance setting unit may be configured to set a relatively low illuminance value for an individual area of which the detected luminance is relatively low and to set a relatively high illumninance value for an individual area of which the detected luminance is relatively high, in individual areas, of which the luminances detected by the luminance analysis unit are within a predetermined range, of the individual areas except the specific individual area.

In one or more embodiments of the present invention, the system may include a first integrated circuit configured to execute processing of setting the specific illuminance value for the specific individual area, and a second integrated circuit configured to execute processing of setting the illuminance value of each individual area, depending on the luminances detected by the luminance analysis unit. In the above aspect, the system may further include a pattern formation control unit configured to determine a formation range of a luminance-dependent light distribution pattern in which illuminance values are set depending on the luminances detected by the luminance analysis unit, and a formation range of a luminance-independent light distribution pattern in which illumninance values are set independently of the luminances detected by the luminance analysis unit. In the above aspect, the system may include a first integrated circuit configured to execute processing of setting the specific illuminance value for the specific individual area, a second integrated circuit configured to execute processing of setting the illuminance values for a part of the individual areas depending on the luminances detected by the luminance analysis unit, and a third integrated circuit configured to execute processing of setting the illuminance values for another part of the individual areas, independently of the luminances detected by the luminance analysis unit.

One or more embodiments of the present invention provides a vehicle lamp control device. The control device includes: a luminance analysis unit configured to detect luminance of each of a plurality of individual areas ahead of a host vehicle based on information obtained from an imaging unit configured to take an image ahead of the host vehicle; a target analysis unit configured to detect target objects ahead of the host vehicle based on the information obtained from the imaging unit; a tracking unit configured to determine a specific target object from the target objects detected by the target analysis unit and to detect displacement of the specific target object based on a detection result of the luminance analysis unit; an illuminance setting unit configured to set, based on the detection result of the luminance analysis unit and a detection result of the tracking unit, an illuminance value of light to be radiated to each individual area, which includes a specific illuminance value for a specific individual area determined according to a position where the specific target object is present; and a light source control unit configured to control a light source unit capable of individually adjusting the illuminance of the light to be radiated to each individual area, based on the illuminance values set by the illuminance setting unit.

One or more embodiments of the present invention provides a vehicle lamp control method. The control method includes: detecting luminance of each of a plurality of individual areas ahead of a host vehicle based on information obtained from an imaging unit configured to take an image ahead of the host vehicle; detecting target objects ahead of the host vehicle based on the information obtained from the imaging unit, determining a specific target object from the detected target objects and detecting displacement of the specific target object based on a detection result of the luminance; setting, based on the detection result of the luminance and a detection result of the displacement, an illuminance value of light to be radiated to each individual area, which includes a specific illuminance value for a specific individual area determined according to a position where the specific target object is present; and controlling a light source unit capable of individually adjusting the illuminance of the light to be radiated to each individual area, based on the set illuminance values.

One or more embodiments of the present invention provides a vehicle lamp system. The system includes: a light source unit capable of individually adjusting an illuminance of light to be radiated to each of a plurality of individual areas ahead of a host vehicle; an imaging unit configured to take an image ahead of the host vehicle; an image analysis unit configured to detect luminance of each individual area, based on information obtained from the imaging unit: an illuminance setting unit configured to set a target luminance value of each individual area and an illuminance value according to the target luminance value of the light to be radiated to each individual area; and a light source control unit configured to control the light source unit based on the illuminance values set by the illuminance setting unit. The illuminance setting unit is configured to set an illuminance value of which a difference from a target illuminance value for obtaining the target luminance value is smaller than a difference between a previously set illuminance value and the target illuminance value and which is deviated from the target illuminance value, so as to gradually bring an actual luminance of each individual area close to the target luminance value. According to this aspect, it is possible to improve formation accuracy of a light distribution pattern in a vehicle lamp.

In one or more embodiments of the present invention, the illuminance setting unit may be configured to reduce a difference between the previously set illuminance value and the presently set illuminance value as a difference between the target luminance value and the actual luminance decreases. In the above aspect, the illuminance setting unit may be configured to set different target luminance values according to at least one of a traveling place and a traveling time zone of the host vehicle. In the above aspect, the image analysis unit may be a high-speed low-accuracy analysis unit, the vehicle lamp system may further include a low-speed high-accuracy analysis unit configured to detect target objects ahead of the host vehicle based on the information obtained from the imaging unit, and a tracking unit configured to determine a specific target object from the target objects detected by the low-speed high-accuracy analysis unit and to detect displacement of the specific target object based on a detection result of the high-speed low-accuracy analysis unit, and the illuminance setting unit may be configured to set a specific target luminance value for a specific individual area determined according to a position where the specific target object is present and to set the target luminance values to be the same, except the specific target luminance value.

One or more embodiments of the present invention provides a vehicle lamp system. The system includes: a light source unit capable of individually adjusting an illuminance of light to be radiated to each of a plurality of individual areas ahead of a host vehicle; an imaging unit configured to take an image ahead of the host vehicle; a high-speed low-accuracy analysis unit configured to detect luminance of each individual area based on information obtained from the imaging unit; a low-speed high-accuracy analysis unit configured to detect target objects ahead of the host vehicle based on the information obtained from the imaging unit; a tracking unit configured to determine a specific target object from the target objects detected by the low-speed high-accuracy analysis unit and to detect displacement of the specific target object based on a detection result of the high-speed low-accuracy analysis unit; an illuminance setting unit configured to set, based on the detection result of the high-speed low-accuracy analysis unit and a detection result of the tracking unit, a target luminance value of each individual area, which includes a specific target luminance value for a specific individual area determined according to a position where the specific target object is present and to set an illuminance value according to the target luminance value of light to be radiated to each individual area; a light source control unit configured to control the light source unit based on the illuminance values set by the illuminance setting unit; and a wiring substrate. The wiring substrate is mounted thereon with at least an integrated circuit configuring the high-speed low-accuracy analysis unit, an integrated circuit configuring the tracking unit, and an integrated circuit configuring the illuminance setting unit. According to this aspect, it is possible to improve radiation accuracy of light in a vehicle lamp.

In one or more embodiments of the present invention, the imaging unit may include a high-speed camera and a low-speed camera, the high-speed low-accuracy analysis unit may be configured to detect the luminance based on information obtained from the high-speed camera, the low-speed high-accuracy analysis unit may be configured to detect the target objects based on information obtained from the low-speed camera, and the wiring substrate may be further mounted thereon with the high-speed camera. In the above aspect, the wiring substrate may be further mounted thereon with an integrated circuit configuring the low-speed high-accuracy analysis unit. In the above aspect, the imaging unit may include a high-speed camera and a low-speed camera, the high-speed low-accuracy analysis unit may be configured to detect the luminance based on information obtained from the high-speed camera, the low-speed high-accuracy analysis unit may be configured to detect the target objects based on information obtained from the low-speed camera, and the wiring substrate may be further mounted thereon with the low-speed camera. In the above aspect, the wiring substrate may be further mounted thereon with an integrated circuit configuring the light source control unit. In the above aspect, the wiring substrate may be further mounted thereon with the light source unit.

One or more embodiments of the present invention provides a vehicle lamp system. The system includes: a light source unit capable of individually adjusting an illuminance of light to be radiated to each of a plurality of individual areas ahead of a host vehicle; an imaging unit configured to take an image ahead of the host vehicle; a high-speed low-accuracy analysis unit configured to detect luminance of each individual area based on information obtained from the imaging unit; a low-speed high-accuracy analysis unit configured to detect target objects ahead of the host vehicle based on the information obtained from the imaging unit; a tracking unit configured to determine a specific target object from the target objects detected by the low-speed high-accuracy analysis unit and to detect displacement of the specific target object based on a detection result of the high-speed low-accuracy analysis unit; air illuminance setting unit configured to set, based on the detection result of the high-speed low-accuracy analysis unit and a detection result of the tracking unit, a target luminance value of each individual area, which includes a specific target luminance value for a specific individual area determined according to a position where the specific target object is present and to set an illuminance value according to the target luminance value of light to be radiated to each individual area; and a light source control unit configured to control the light source unit based on the illuminance values set by the illuminance setting unit. The high-speed low-accuracy analysis unit is configured by a parallel processing computing device and the low-speed high-accuracy analysis unit is configured by a sequential processing computing device. According to this aspect, it is possible to improve radiation accuracy of light in a vehicle lamp.

In one or more, embodiments of the present invention, the tracking unit and the illuminance setting unit may be configured by a parallel processing computing device. In the above one aspect, the parallel processing computing device may include one or inure integrated circuits selected from a group consisting of an FPGA, an ASIC and a SoC, and the sequential processing computing device may include one or more integrated circuits selected from a group consisting of a CPU and a microcontroller.

In the meantime, any combination of the above constitutional elements, and a method, an apparatus, a system and the like expressing are also within a scope of the present invention.

According to one or more embodiments of the present invention, it is possible to improve the radiation accuracy of light or formation accuracy of a light distribution pattern in a vehicle lamp.

BRIEF DESCRIPTION OF DRAWINGS

FIGS. 5A and 5B are flowcharts illustrating an example of an ADB control that s executed in a vehicle lamp system according to first to sixth exemplary embodiments.

DETAILED DESCRIPTION

Figure 1:
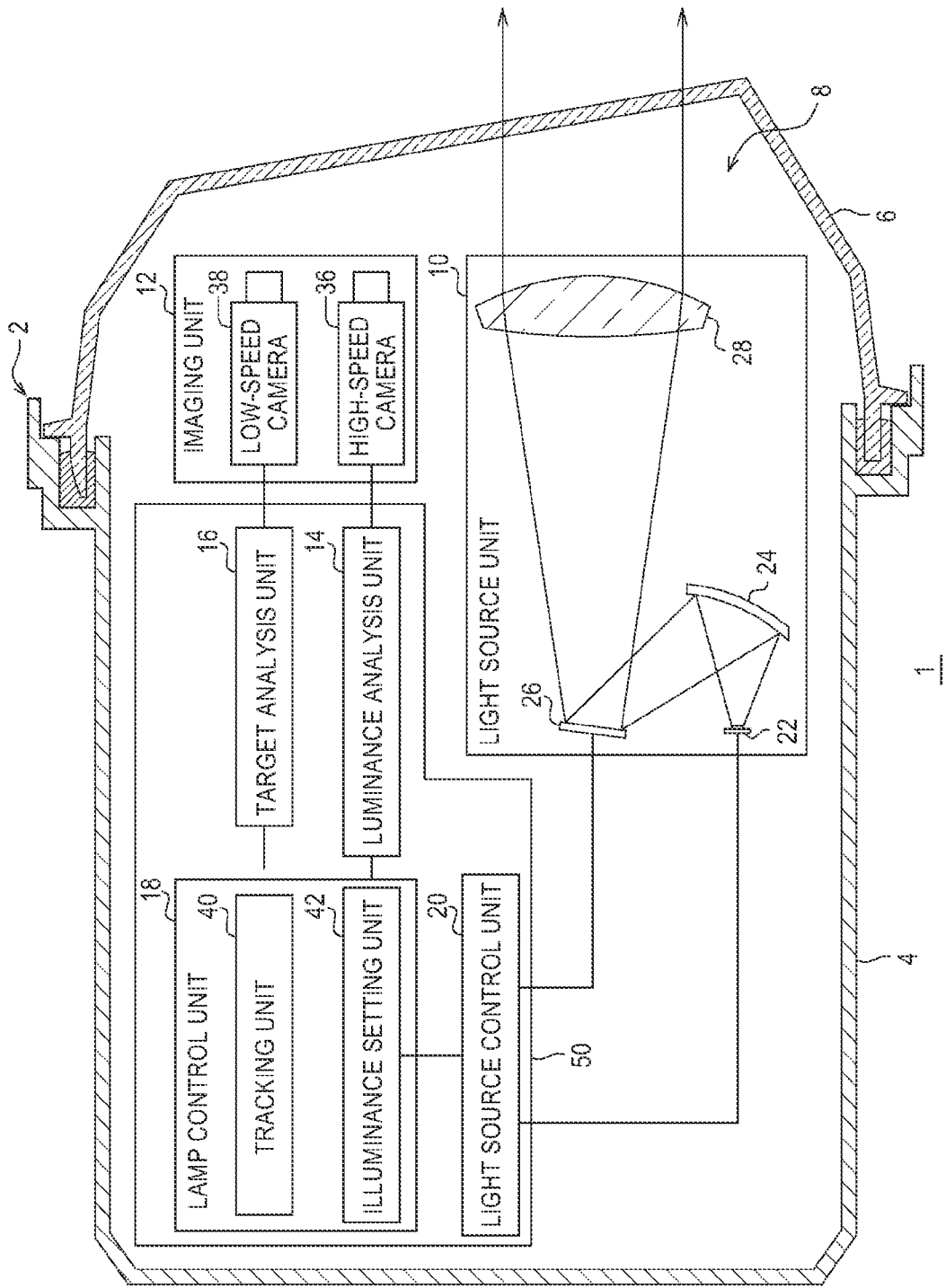
FIG. 1 illustrates a schematic configuration of a vehicle lamp system according first to fourth exemplary embodiments.

Hereinafter, exemplary embodiments of the present invention will be described with reference to the drawings. The exemplary embodiments are merely exemplary, not to limit the invention, and not all features and combinations thereof described in the exemplary embodiments are essential to the invention. The same or equivalent constitutional elements, members and processing shown in each drawing are denoted with the same reference numerals, and overlapping descriptions thereof are appropriately omitted. The scale and shape of each unit shown in each drawing are conveniently set for easy description, and should not be construed as being limited unless particularly mentioned. When the terms such as "first", "second" and the like are used in the specification or the claims, the terms are used so as to distinguish any configuration and other configurations, not to indicate any order or a degree of importance, unless particularly mentioned. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Exemplary Embodiment

FIG. 1 illustrates a schematic configuration of a vehicle lamp system according to a first exemplary embodiment. In FIG. 1, some of constitutional elements of a vehicle lamp system 1 are shown as functional blocks. The functional blocks are implemented by a device and a circuit, including a CPU and a memory of a computer, as a hardware configuration, and are implemented by a computer program and the like, as a software configuration. It can be appreciated by one skilled in the art that the functional blocks are implemented in various forms by combinations of the hardware and the software.

The vehicle lamp system 1 is applied to a vehicle headlight device including a pair of headlight units arranged at left and light sides of a vehicle front. Since the pair of headlight units has substantially the same configuration, except bilaterally symmetrical structures, a structure of one headlight unit is shown as a vehicle lamp 2 in FIG. 1.

The vehicle lamp 2 of the vehicle lamp system 1 includes a lamp body 4 having an opening at a vehicle front side, and a light-transmitting cover 6 attached to cover the opening of the lamp body 4. The light-transmitting cover 6 is made of light-transmitting resin, glass or the like. In a lamp chamber 8 formed by the lamp body 4 and the light-transmitting cover 6, a light source unit 10, an imaging unit 12, and a control device 50 are accommodated.

The light source unit 10 is a device capable of individually adjusting an illuminance (intensity) of light to be radiated to each of a plurality of individual areas (refer to FIG. 3) ahead of a host vehicle. The light source unit 10 includes a light source 22, a reflection optical member 24, a light deflection device 26, and a projection optical member 28. The respective parts are attached to the lamp body 4 by a support mechanism (not shown).

As the light source 22, a semiconductor light-emitting device such as an LED (Light emitting diode), an LD (Laser diode), an EL (Electroluminescence) device and the like, a lamp bulb, an incandescent lamp (halogen lamp), a discharge lamp, and the like can be used.

The reflection optical member 24 is configured to guide light emitted from the light source 22 to a reflective surface of the light deflection device 26. The reflection optical member 24 is configured by a reflecting mirror of which an inner surface is formed as a predetermined reflective surface. In the meantime, the reflection optical member 24 may be a solid light guiding member. When the light emitted from the light source 22 can be directly guided to the light deflection device 26, the reflection optical member 24 may not be provided.

The light deflection device is arranged on an optical axis of the projection optical member 28 and is configured to selectively reflect the light emitted from the light source 22 toward the projection optical member 28. The light deflection device 26 is configured by a DMD (Digital Mirror Device), for example. That is, the light deflection device 26 has a plurality of micro mirrors aligned in an array (matrix) shape. By controlling angles of reflective surfaces of the plurality of micro mirrors, respectively, it is possible to selectively change a reflection direction of the light emitted from the light source 22. That is, the light deflection device 26 can reflect a part of the light emitted from the light source 22 toward the projection optical member 28 and the other light toward a direction in which the light is not efficiently used by the projection optical member 28. Here, the direction in which the light is not efficiently used can be construed as a direction in which the light is incident on the projection optical member 28 but does not mostly contribute to formation of a light distribution pattern or a direction toward a light absorption member (light shield member) (not shown), for example.

Figure 2A:
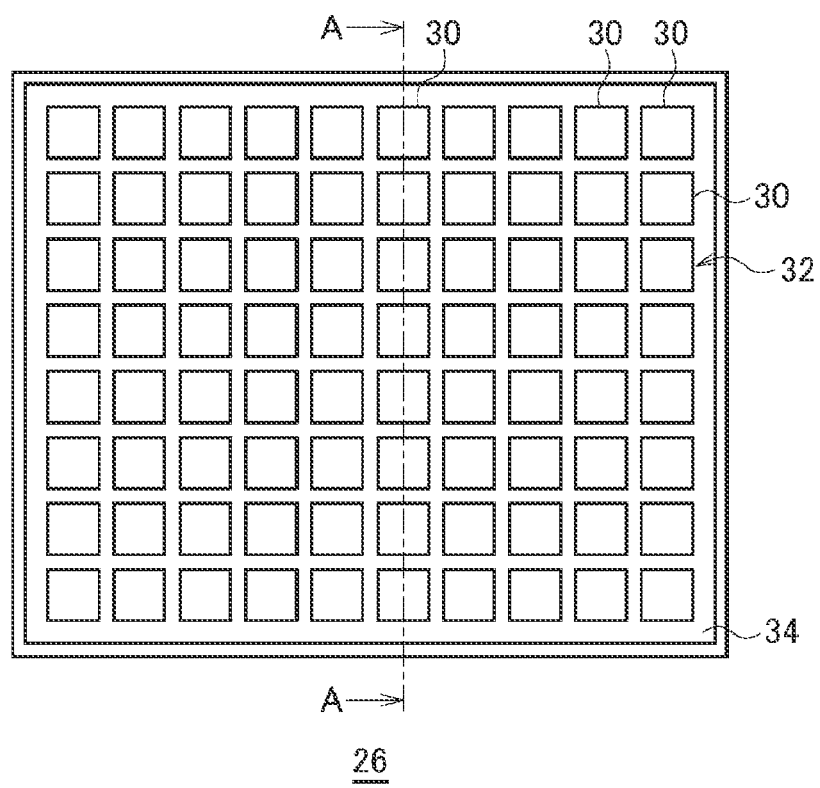
FIG. 2A is a front view illustrating a schematic configuration of a light deflection device.
Figure 2B:
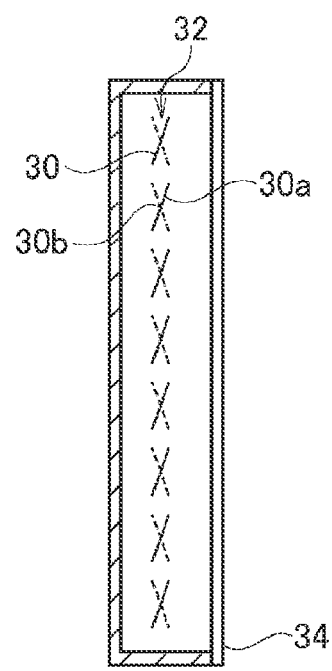
FIG. 2B is a sectional view taken along a line A-A of the light deflection device shown in FIG. 2A.

FIG. 2A is a front view illustrating a schematic configuration of the tight deflection device 26, and FIG. 2B is a sectional view taken along a line A-A of the light deflection device shown in FIG. 2A. The light deflection device 26 includes a micro mirror array 32 in which a plurality of micro mirror elements 30 are aligned in a matrix shape, and a clear cover member 34 arranged at a front side (a right side of the light deflection device 26 shown in FIG. 2B) of reflective surfaces 30a of the mirror elements 30. The cover member 34 is made of glass, plastic or the like, for example.

The mirror element 30 has a substantial square shape and has a rotary axis 30b extending in a horizontal direction and substantially bisecting the mirror element 30. Each mirror element 30 of the micro mirror array 32 is configured to switch between a first reflection position (a position shown with a solid line in FIG. 2B) at Which the light emitted from the light source 22 is reflected toward the projection optical member 28 so as to be used as a pail of a desired light distribution pattern and a second reflection position (a position shown with a broken line in FIG. 2B) at which the light emitted from the light source 22 is reflected so as not to be efficiently used. Each mirror element 30 is configured to rotate about the rotary axis 30b and to individually switch between the first reflection position and the second reflection position. Each mirror element 30 is located at the first reflection position in an on-state and is located at the second reflection position in an off-state.

Figure 3:
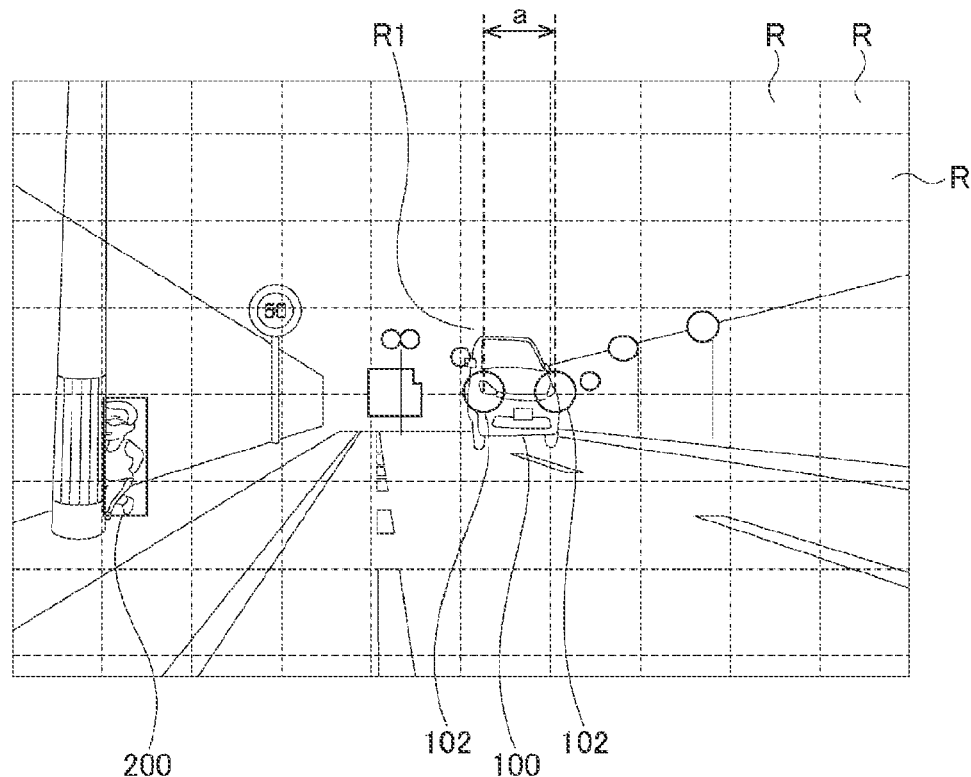
FIG. 3 schematically illustrates an appearance ahead of a host vehicle.

FIG. 3 schematically illustrates an appearance ahead of the host vehicle. As described above, the light source unit 10 has the plurality of mirror elements 30 as individual radiation units capable of individually radiating the light toward an area in front of the lamp. The light source unit 10 can radiate the light to a plurality of individual areas R aligned ahead of the host vehicle by the mirror elements 30. Each individual area R is an area corresponding to one pixel or a set of a plurality of pixels of the imaging unit 12, specifically, a high-speed camera 36, for example. In the first exemplary embodiment, each individual area R and each mirror element 30 are associated with each other.

In FIG. 2A and FIG. 3, for convenience of descriptions, the mirror elements 30 and the individual areas R are aligned by breadth 10×length 8. However, the numbers of the mirror elements 30 and the individual areas R are not particularly limited. For example, a resolution of the micro mirror array 32 (in other words, the numbers of the mirror elements 30 and the individual areas R) is 1,000 to 300,000 pixels. Also, a time necessary for the light source unit 10 to form one light distribution pattern is, for example, 0.1 to 5 ms. That is, the light source unit 10 can change the light distribution pattern every 0.1 to 5 ms.

As shown in FIG. 1, the projection optical member 28 is configured by a free curve surface lens of which a front surface and a rear surface have free curve surface shapes, for example. The projection optical member 28 is configured to project a light source image, which is formed on a rear focal plane including a rear focus thereof, toward the front of the lamp, as a reverted image. The projection optical member 28 is arranged so that the rear focus thereof is located on an optical axis of the vehicle lamp 2 in the vicinity of the reflective surface of the micro mirror array 32. In the meantime, the projection optical member 28 may be a reflector.

The light emitted from the light source 22 is reflected on the reflection optical member 24 and is then radiated to the micro mirror array 32 of the light deflection device 26. The light deflection device 26 is configured to reflect the light toward the projection optical member 28 by a predetermined mirror element 30 located at the first reflection position. The reflected light travels ahead of the lamp through the projection optical member 28 and is radiated to each individual area R corresponding to each mirror element 30. Thereby, a light distribution pattern having a predetermined shape is formed ahead of the lamp.

The imaging unit 12 is a device configured to take an image ahead of the host vehicle. The imaging unit 12 includes a high-speed camera 36 and a low-speed camera 38. The high-speed camera 36 has a relatively high frame rate, for example 200 fps to 10000 fps (0.1 to 5 ms per one frame). On the other hand, the low-speed camera 38 has a relatively low frame late, for example 30 fps to 120 fps (about 8 to 33 ms per one frame). The high-speed camera 36 has a relatively low resolution, for example, 300,000 pixels to 5,000,000 pixels. On the other hand, the low-speed camera 38 has a relatively high resolution, for example, 5,000,000 or higher pixels. The high-speed camera 36 and the low-speed camera 38 are configured to take an image of all the individual areas R. In the meantime, the resolutions of the high-speed camera 36 and the low-speed camera 38 are not limited to the above numerical values and can be set to arbitrary values within a technically conformable range.

The control device 50 includes a luminance analysis unit 14, a target analysis unit 16, a lamp control unit 18, and a light source control unit 20. Image data obtained by the imaging unit 12 is transmitted to the luminance analysis unit 14 and the target analysis unit 16.

The luminance analysis unit 14 is configured to detect luminance of each individual area R based on the information (image data) obtained from the imaging unit 12, The luminance analysis unit 14 is a high-speed low-accuracy analysis unit configured to execute an image analysis having lower accuracy and to output an analysis result at higher speed than the target analysis unit 16. In the first exemplary embodiment, the luminance analysis unit 14 is configured to detect luminance of each individual area R based on information obtained from the high-speed camera 36. The luminance analysis unit 14 is configured to detect luminance of each individual area R every 0.1 to 5 ms, for example. A detection result of the luminance analysis unit 14, i.e., a signal indicative of the luminance information of the individual area R is transmitted to the lamp control unit 18.

The target analysis unit 16 is configured to detect target objects ahead of the host vehicle based on the information obtained from the imaging unit 12. The target analysis unit 16 is a low-speed high-accuracy analysis unit configured to execute an image analysis having higher accuracy and to output an analysis result at lower speed than the luminance analysis unit 14. In the first exemplary embodiment, the target analysis unit 16 is configured to detect target objects based on information obtained from the low-speed camera 38. The target analysis unit 16 is configured to detect target objects every 50 ms, for example. As the target objects that are detected by the target analysis unit 16, an oncoming vehicle 100, a pedestrian 200 and the like are exemplified, as shown in FIG. 3. A preceding vehicle, and an obstacle, a road marker, a road sign, a road shape and the like, which might interfere with traveling of the host vehicle, are also included in the target objects.

The target analysis unit 16 can detect the target objects by using the known method including algorithm recognition, deep learning and the like. For example, the target analysis unit 16 stores therein in advance a feature point indicative of the oncoming vehicle 100. When data including the feature point indicative of the oncoming vehicle 100 is present in the imaged data of the low-speed camera 38, the target analysis unit 16 recognizes a position of the oncoming vehicle 100. "The feature point indicative of the oncoming vehicle 100" is a light spot 102 (refer to FIG. 3) having a predetermined light intensity or higher and appearing in an estimated presence area of a headlight of the oncoming vehicle 100, for example. The target analysis unit 16 stores therein in advance feature points indicative of the pedestrian 200 and the other target objects. When data including the feature points is present in the imaged data of the low-speed camera 38, the target analysis unit 16 recognizes positions of the target objects corresponding to the feature points, A detection result of the target analysis unit 16, i.e., a signal indicative of the target information ahead of the host vehicle is transmitted to the lamp control unit 18.

The lamp control unit 18 is configured to determine a specific target object, detect displacement of the specific target object, set a specific individual area R1, set a target luminance value for each individual area R, which includes a specific target luminance value for the specific individual area R1, set an illuminance value of light to be radiated to each individual area R, and the like by using the detection results of the luminance analysis unit 14 and/or the target analysis unit 16. For example, the lamp control unit 18 includes a tracking unit 40, and an illuminance setting unit 42. The tracking unit 40 is configured to determine a specific target object front the target objects detected by the target analysis unit 16. The tracking unit 40 is configured to detect displacement of the specific target object based on the detection result of the luminance analysis unit 14. In the first exemplary embodiment, the oncoming vehicle 100 is set as the specific target object, for example.

Specifically, the tracking unit 40 is configured to aggregate the detection result of the luminance analysis unit 14 and the detection result of the target analysis unit 16. The tracking unit 40 is configured to associate the luminance of the individual area R, in which the light spot 102 of the oncoming vehicle 100 that is the specific target object is located, of the luminances of the respective individual areas R detected by the luminance analysis unit 14 with the oncoming vehicle 100. The tracking unit 40 can detect displacement of the oncoming vehicle 100 that is the specific target object by recognizing a position of the luminance associated with the oncoming vehicle 100 in the detection result of the luminance analysis unit 14 to be obtained thereafter. The tracking unit 40 is configured to execute determination processing of the specific target object every 50 ms, for example. The tracking unit 40 is configured to execute displacement detection processing (tracking) of the specific target object every 0.1 to 5 ms, for example.

The illuminance setting unit 42 is configured to set an illuminance value of light to be radiated to each individual area, which includes a specific illuminance value for the specific individual area R1 determined according to a position where the specific target object is present, based on the detection result of the luminance analysis unit 14 and the detection result of the tracking unit 40. For example, the illuminance setting unit 42 is configured to set a target luminance value of each individual area R and an illuminance value according to a target luminance value of light to be radiated to each individual area R. For the specific individual area R1 of the respective individual areas R, a specific target luminance value is set. Therefore, the specific illuminance value is an illuminance value to be set according to the specific target luminance value.

The illuminance setting unit 42 is configured to set the specific individual area R1, based on a presence position of the oncoming vehicle 100 that is the specific target object. For example, the illuminance setting unit 42 is configured to set the specific individual area R1, based on position information of the oncoming vehicle 100 included in the detection result of the tracking unit 40. For the setting of the specific individual area R1, for example, the illuminance setting unit 42 is configured to set a vertical direction distance b having a preset predetermined ratio to a horizontal direction distance a (refer to FIG. 3) between the two light spots 102 corresponding to the headlights of the oncoming vehicle 100, and to set an individual area R overlapping a dimension range of breadth a×length b, as the specific individual area R1 (refer to FIG. 3). In the specific individual area R1, the individual area R overlapping a driver of the oncoming vehicle is included.

Figure 4:
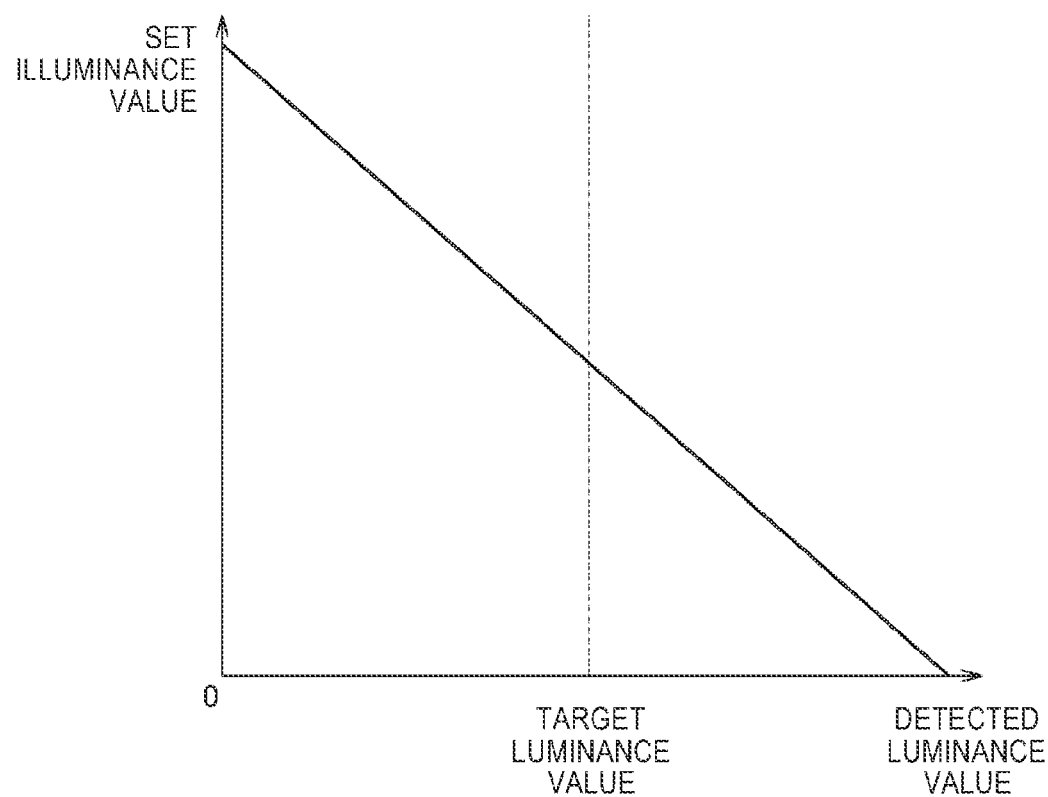
FIG. 4 illustrates a relation between a detected luminance value and a set illuminance value in a constant luminance control.

The illuminance setting unit 42 is configured to set a specific target luminance value for the specific individual area R1. The illuminance setting unit 42 is configured to set target luminance values for the other individual areas R except the specific individual area R1. For example, the illuminance selling unit 42 is configured to set the same target luminance value for the individual areas R, of which the luminances detected by the luminance analysis unit 14 are within a predetermined range, of the individual areas R except the specific individual area R1. That is, the illuminance setting unit 42 is configured to execute a constant luminance control. FIG. 4 illustrates a relation between a detected luminance value and a set illuminance value in the constant luminance control. As shown in FIG. 4, in the constant luminance control, a relatively high illuminance value is set for an individual area R of which the detected luminance is relatively low and a relatively low illuminance value is set for an individual area R of which the detected luminance is relatively high, in individual areas R except the specific individual area R1. In the meantime, "the predetermined range" may be an entire range or a partial range of luminances that can be detected by the luminance analysis unit 14. In FIG. 4, the entire range of luminances that can be detected by the luminance analysis unit 14 is set as "the predetermined range".

The illuminance setting unit 42 is configured to recognize displacement of the specific individual area R1 based on the detection result of the tracking unit 40 and to update the position information of the specific individual area R1. The illuminance setting unit is configured to update the target luminance value of each individual area R, which includes the specific target luminance value for the specific individual area R1. The processing by the tracking unit 40 and the processing by the illuminance setting unit 42 are executed at least temporarily in parallel.

The illuminance setting unit 42 is configured to set an illuminance value of light to be radiated from the light source unit 10 to each individual area R, based on the target luminance value of each individual area R and the detection result of the luminance analysis unit 14. The illuminance setting unit 42 is configured to transmit a signal indicative of the illuminance value of each individual area R to the light source control unit 20. The illuminance setting unit 42 is configured to set the target luminance value and the illuminance value every 0.1 to 5 ms, for example.

In the meantime, the illuminance setting unit 42 may be configured to change the target luminance value according to brightness and the like around the host vehicle. That is, the target luminance values are set so that the front of the host vehicle is to be optimally bright in the city and the suburbs or in the daytime, at the evening and at night. The illuminance setting unit 42 may be configured to set the target luminance values of the individual areas R to be different, except the specific individual area R1.

The light source control unit 20 is configured to control the light source unit 10 based on the illuminance values set by the illuminance setting unit 42. The light source control unit 20 is configured to control turning on/off of the light source 22 and on/off switching of each mirror element 30. The light source control unit 20 is configured to adjust a time ratio (width or frequency) of the on-state of each mirror element 30 based on the illuminance value of the light to be radiated to each individual area R. Thereby, the illuminance of the light to be radiated to each individual area R can be adjusted. The light source control unit 20 is configured to transmit a drive signal to the light source 22 and/or the light deflection device 26 every 0.1 to 5 ms, for example.

The light is radiated from the light source unit 10 based on the illuminance values set by the illuminance setting unit 42, and an actual luminance value of each individual area R is resultantly detected by the luminance analysis unit 14. Then, the illuminance setting unit 42 is configured to again set an illuminance value based on the detection result.

By the above configurations, the vehicle lamp system 1 can form a light distribution pattern including a plurality of partial illumination areas. Each of the plurality of partial illumination areas is formed when the corresponding mirror element 30 is on. The vehicle lamp system 1 can form various light distribution patterns by switching the on/off states of the respective mirror elements 30.

The vehicle lamp system 1 is configured to execute an ADB (Adaptive Driving Beam) control of forming an optimal light distribution pattern according to a position of the specific target object ahead of the host vehicle. For example, the illuminance setting unit 42 sets the specific target luminance value "0" for the specific individual area R1 determined according to a position where the oncoming vehicle 100 is present and sets the target luminance value "1" for the other individual areas R. This setting is referred to as first luminance information. The illuminance setting unit 42 sets the target luminance value "2" for all the individual areas R according to the constant luminance control. This setting is referred to as second luminance information. Then, the illuminance setting unit 42 performs an AND operation for the first luminance information and the second luminance information. Thereby, luminance information in which the specific target luminance value "0" is set for the specific individual area R1 and the target luminance value "2" is set for the other individual areas R is generated.

Then, the illuminance setting unit 42 sets the specific illuminance value "0" for the specific individual area R1 for which the specific target luminance value "0" is set. That is, the light to the specific individual area R1 is shielded. The luminance of the individual area R, in which an object such as a streetlamp configured to self emit light exists, of the respective individual areas R except the specific individual area R1 does not have a difference from the target luminance value or is equal to or greater than the target luminance value. Therefore, the illuminance setting unit 42 sets the illuminance value "0" for the corresponding individual area R, and shields the light. Since the luminance of the individual area R, in which an object such as a mad marker, a delineator, a reflection plate and the like having high light reflectivity exists, has a smaller difference from the target luminance value, as compared to the other individual areas R, a relatively small illuminance value is set for the corresponding individual area. That is, the light to the corresponding individual area R is reduced. In this way, the light distribution pattern of which the illuminance of each area is set is formed ahead of the host vehicle, so that the light is not radiated to a driver of the oncoming vehicle 100 and the individual areas R except the specific individual area R1 have the same brightness, as seen from a driver of the host vehicle or the imaging unit 12.

FIG. 5A and FIG. 5B are flowcharts illustrating an example of the ADB control that is executed in the vehicle lamp system according to the first exemplary embodiment. This flow is repeatedly executed at predetermined timings when an execution instruction of the ADB control is issued by a light switch (not shown) and an ignition is on, and ends when the execution instruction of the ADB control is released (or a stop instruction thereof is issued) or the ignition is off. The flow shown in FIG. 5A is low-speed processing that is repeatedly executed every 50 ms, for example, and the flow shown in FIG. 5B is high speed processing that is repeatedly executed every 0.1 to 5 ms, for example. The high-speed processing and the low-speed processing are executed in parallel.

As shown in FIG. 5A, in the low-speed processing, an area ahead of the host vehicle is first imaged by the low-speed camera 38 (S101). Then, target objects ahead of the host vehicle are detected based on the image data of the low-speed camera 38 by the target analysis unit 16 (S102). Then, it is determined whether a specific target object is included in the detected target objects (S103). The determination is executed by the tracking unit 40, for example.

When it is determined that the specific target object is included (Y in S103), the specific target object is determined by the tracking unit 40 (S104). Then, the specific individual area R1 is set based on the presence position of the specific target object by the illuminance setting unit 42 (S105), and the present routine ends. When it is determined that the specific target object is not included (N in S103), the present routine ends.

As shown in FIG. 5B, in the high-speed processing, an area ahead of the host vehicle is first imaged by the high-speed camera 36 (S201). Then, the luminance of each individual area R is detected based on the image data of the high-speed camera 36 by the luminance analysis unit 14 (S202). Then, it is determined whether a specific individual area R1 is set (S203). The determination is executed by the tracking unit 40, for example. When it is determined that the specific individual area R1 is set (Y in S203), the specific target object is tracked and a position (displacement) of the specific individual area R1 is detected by the tracking unit 40. The illuminance setting unit 42 updates the setting (position information) of the specific individual area R1 based on the detection result of the tracking unit 40 (S204).

Then, the target luminance value of each individual area R is set by the illuminance setting unit 42 (S205). For the specific individual area R1, the specific target luminance value is set. Then, the illuminance value of the light to be radiated to each individual area R is set based on the target luminance value of each individual area R and the detection result of the luminance analysis unit 14 by the illuminance setting unit 42 (S206). For the specific individual area R1, the specific illuminance value is set. Then, the light source unit 10 is driven by the light source control unit 20, the light having the set illuminance is radiated from the light source unit 10 (S207), and the present routine ends. When it is determined that the specific individual area R1 is not set (N in S203), the target luminance values of the individual areas R are set by the illuminance setting unit 42 (S205). In this case, the specific target luminance value is not included in the set target luminance values. Thereafter, processing of steps S206 and S207 is executed, and the present routine ends.

In step S204, when disappearance of the specific target object is detected as a result of the tracking, the setting of the specific individual area R1 is also disappeared. Therefore, the specific target luminance value is not included in the target luminance values set in step S205. In step S203 of a next routine, it is determined that the specific individual area R1 is not set (N in S203), until the processing of step S105 is executed.

Figure 6A:
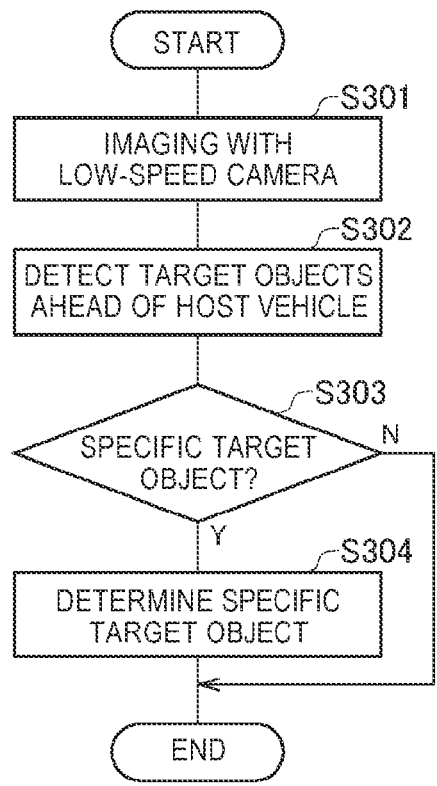
FIGS. 6A and 6B are flowcharts illustrating another example of the ADB control that is executed in the vehicle lamp system according to the first to sixth exemplary embodiments.
Figure 6B:
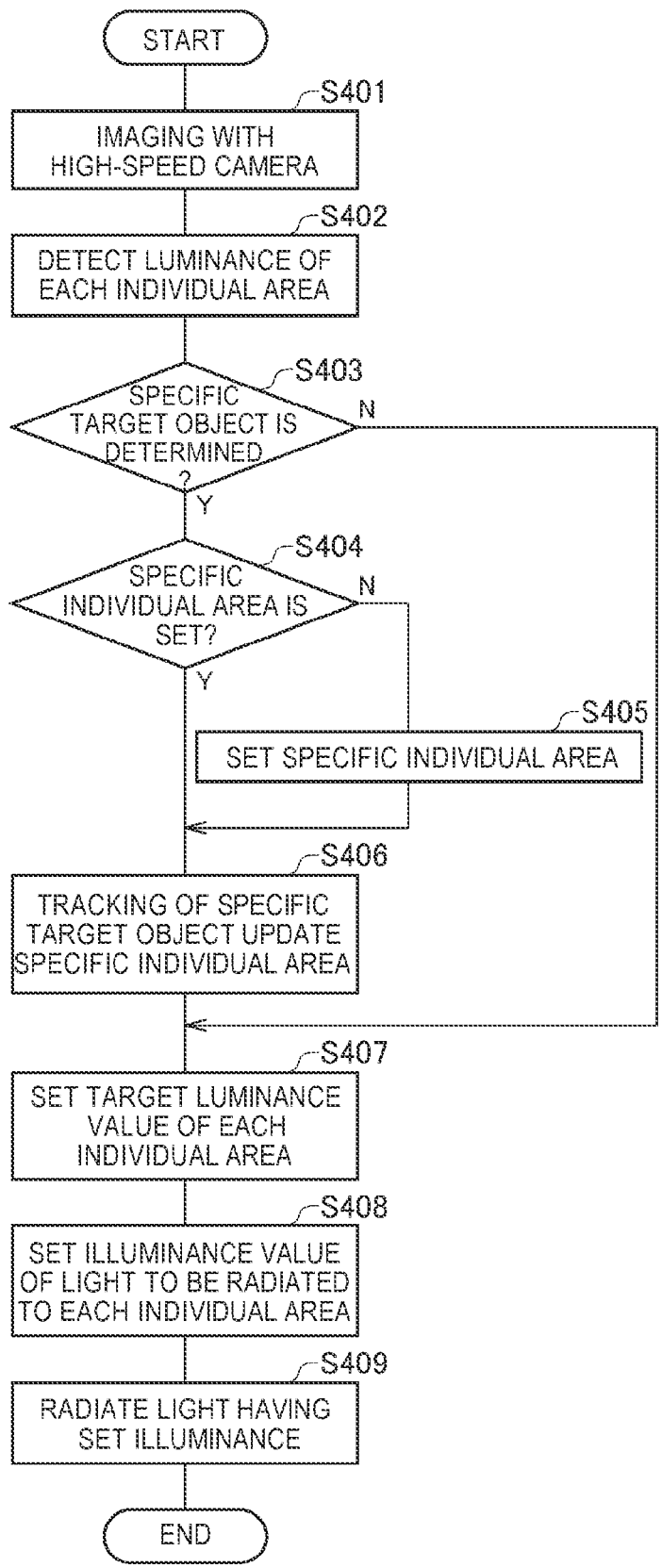

FIG. 6A and FIG. 6B are flowcharts illustrating another example of the ADB control that is executed in the vehicle lamp system according to the first exemplary embodiment. This flow is repeatedly executed at timings similar to the flowcharts shown in FIG. 5A and FIG. 5B. The flow shown in FIG. 6A is low-speed processing that is repeatedly executed every 50 ms, for example, and the flow shown in FIG. 6B is high-speed processing that is repeatedly executed every, 0.1 to 5 ms, for example. The low-speed processing and the high-speed processing are executed in parallel.

As shown in FIG. 6A, in the low-speed processing, an area ahead of the host vehicle is first imaged by the low-speed camera 38 (S301). Then, target objects ahead of the host vehicle are detected based on the image data of the low-speed camera 38 by the target analysis unit 16 (S302). Then, it is determined whether a specific target object is included in the detected target objects (S303). The determination is executed by the tracking unit 40, for example. When it is determined that the specific target object is included (Y in S303), the specific target object is determined by the tracking unit 40 (S304) and the present routine ends. When it is determined that the specific target object is not included (N in S303), the present routine ends.

As shown in FIG. 6B, in the high-speed processing, an area ahead of the host vehicle is first imaged by the high-speed camera 36 (S401). Then, the luminance of each individual area R is detected based on the image data of the high-speed camera 36 by the luminance analysis unit 14 (S402). Then, it is determined whether a specific target object is determined (S403). When it is determined that the specific target object is determined (Y in S403), it is determined whether a specific individual area R1 is set (S404). The determinations of step S403 and S404 are executed by the tracking unit 40, for example. When it is determined that the specific individual area R1 is set (Y in S404), the specific target object is tracked and a position (displacement) of the specific individual area R1 is detected by the hacking unit 40. The illuminance setting unit 42 updates the setting (position information) of the specific individual area R1 based on the detection result of the tracking unit 40 (S406). When it is determined that the specific individual area R1 is not set (N in S404), a specific individual area R1 is set based on the presence position of the specific target object by the illuminance setting unit 42 (S405), and then processing of step S406 is executed.

Then, the target luminance value of each individual area R is set by the illuminance setting unit 42 (S407). For the specific individual area R1, the specific target luminance value is set. Then, the illuminance value of the light to be radiated to each individual area R is set based on the target luminance value of each individual area R and the detection result of the luminance analysis unit 14 by the illuminance setting unit 42 (S408). For the specific individual area R1, the specific illuminance value is set. Then, the light source unit 10 is driven by the light source control unit 20, the light having the set illuminance is radiated from the light source unit 10 (S409), and the present routine ends. When it is determined that the specific target object is not determined (N in S403), the target luminance values of the individual areas R are set by the illuminance setting unit 42 (S407). In this case, the specific target luminance value is not included in the set target luminance values. Thereafter, processing of steps S408 and S409 is executed and the present routine ends.

In step S406, when disappearance of the specific target object is detected as a result of the tracking, the setting of the specific individual area R1 is also disappeared. Therefore, the specific target luminance value is not included in the target luminance values set in step S407, in step S403 of a next routine, it is determined that the specific target object is not determined (N in S403), until the processing of step S304 is executed.

As described above, the vehicle lamp system 1 according to the first exemplary embodiment includes the light source unit 10, the imaging unit 12, the luminance analysis unit 14, the target analysis unit 16, the tracking unit 40, the illuminance setting unit 42, and the light source control unit 20. The light source unit 10 can individually adjust the illuminance of the light to be radiated to each of the plurality of individual areas R. The luminance analysis unit 14 is configured to detect the luminance of each individual area R. The target analysis unit 16 is configured to detect the target objects ahead of the host vehicle. The tracking unit 40 is configured to determine the specific target object from the target objects detected by the target analysis unit 16 and to detect displacement of the specific target object based on the detection result of the luminance analysis unit 14. The illuminance setting unit 42 is configured to set the target luminance value of each individual area R, which includes the specific target luminance value for the specific individual area R1 determined according to a position where the specific target object is present, based on the detection result of the luminance analysis unit 14 and the detection result of the tracking unit 40. The illuminance setting unit 42 is configured to set the illuminance value of the light to be radiated from the light source unit 10 to each individual area R. The light source control unit 20 is configured to control the light source unit 10 based on the illuminance values set by the illuminance setting unit 42.

The target analysis unit 16 can detect the target objects with high accuracy. However, since a relatively long time is required for image processing, the analysis speed is slow. Therefore, if the ADB control is executed based on only the analysis result of the target analysis unit 16, when the specific target object is the oncoming vehicle 100, for example, it is possible to form a light distribution pattern where a light shield area is narrowed and visibility of a driver of the host vehicle is improved. However, it is difficult to make the light shield area follow up the displacement of the oncoming vehicle 100 with high accuracy.

In the meantime, since the luminance analysis unit 14 configured to execute simple luminance detection requires a relatively short time for image processing, it is possible to perform high-speed analysis. However, since the target detection accuracy is low, it is difficult to correctly recognize a presence position of the target object. Therefore, if the ADB control is executed based on only the analysis result of the luminance analysis unit 14, it is necessary to set a wide light shield area of the light distribution pattern, which costs the visibility of the driver of the host vehicle.

In contrast, according to the vehicle lamp system 1 of the first exemplary embodiment, a position where the oncoming vehicle 100 is present is recognized with high accuracy, and the light distribution pattern is determined by the combination of the target analysis unit 16, which is a low-speed advanced image analysis means, and the luminance analysis unit 14, which is a simple high-speed image analysis means. Therefore, it is possible to improve the radiation accuracy of light in the vehicle lamp 2, in other words, the formation accuracy of the light distribution pattern. As a result, it is possible to realize both the avoidance of the glare to the driver of the oncoming vehicle 100 and the visibility of the driver of the host vehicle in a higher level.

The imaging unit 12 of the first exemplary embodiment includes the high-speed camera 36 and the low-speed camera 38. The luminance analysis unit 14 is configured to detect the luminance based on the information obtained from the high-speed camera 36, and the target analysis unit 16 is configured to detect the target objects based on the information obtained from the low-speed camera 38. In this way, the cameras are respectively allotted to the luminance analysis unit 14 and the target analysis unit 16, so that it is possible to adopt the dedicated camera for performance required for each image analysis. In general, a single camera having performances required for both the image analyses of the luminance analysis unit 14 and the target analysis unit 16 is expensive. According to the first exemplary embodiment, it is possible to reduce the costs of the imaging unit 12 and the vehicle lamp system 1.

The illuminance setting unit 42 of the first exemplary embodiment is configured to set the target luminance values to be the same, except the specific target luminance value. By executing the constant luminance control, it is possible to improve the target detection accuracy of the target analysis unit 16. As a result, it is possible to further improve the radiation accuracy of light in the vehicle lamp 2.

In the meantime, the specific target object may be the pedestrian 200. In this case, the specific target luminance value of the specific individual area R1 is set greater, as compared to those of the other individual areas R. Thereby, it is possible to radiate the pedestrian 200 with the light having higher illuminance, thereby allowing the driver of the host vehicle to easily recognize the pedestrian 200. The tracking unit 40 can detect a position of the pedestrian 200 by implementing the known image processing such as edge enhancement for the luminance data of each individual area R, which is the detection result of the luminance analysis unit 14. The edge enhancement may be included in the processing of the luminance analysis unit 14.

Second Exemplary Embodiment

A vehicle lamp system according to a second exemplary embodiment has substantially the same configuration as the vehicle lamp system according to the first exemplary embodiment, except that a high contrast control is executed. In the below, the vehicle lamp system of the second exemplary embodiment is described focusing on a configuration different from the first exemplary embodiment, and the common configuration is simply described or the description thereof is omitted.

The illuminance setting unit 42 may be configured to execute a high contrast control, instead of or in addition to the constant luminance control. The high contrast control is a control of setting a relatively low illuminance value for an individual area R of which the detected luminance is relatively low and to set a relatively high illuminance value for an individual area R of which the detected luminance is relatively high, in individual areas, of which the luminances detected by the luminance analysis unit 14 are within a predetermined range, of the individual areas R except the specific individual area R1. For example, for an individual area R of which luminance is lower than a preset threshold value, a target luminance value lower than the detected luminance value is set. As a result, for the corresponding individual area R, a relatively low illuminance value is set. On the other hand, for an individual area R of which luminance is higher than the preset threshold value, a target luminance value higher than the detected luminance value is set. As a result, for the corresponding individual area R, a relatively high illuminance value is set. By the high contrast control, a bright individual area R becomes brighter, and a dark individual area R becomes darker. That is, for a radiation target object ahead of the host vehicle, a light-dark contrast is enhanced. Thereby, it is possible to improve the target detection accuracy of the target analysis unit 16.

In the high contrast control, the relatively low illuminance value to be newly set may be smaller than the currently set illuminance value, and the relatively high illuminance value to be newly set may be greater than the currently set illuminance value. In this case, a positive feedback is applied, so that the set illuminance value will be polarized to 0 and a maximum value. When the illuminance value becomes polarized, it may be difficult to secure the visibility of the driver in the individual area R in which the illuminance value 0 is set.

Figure 7A:
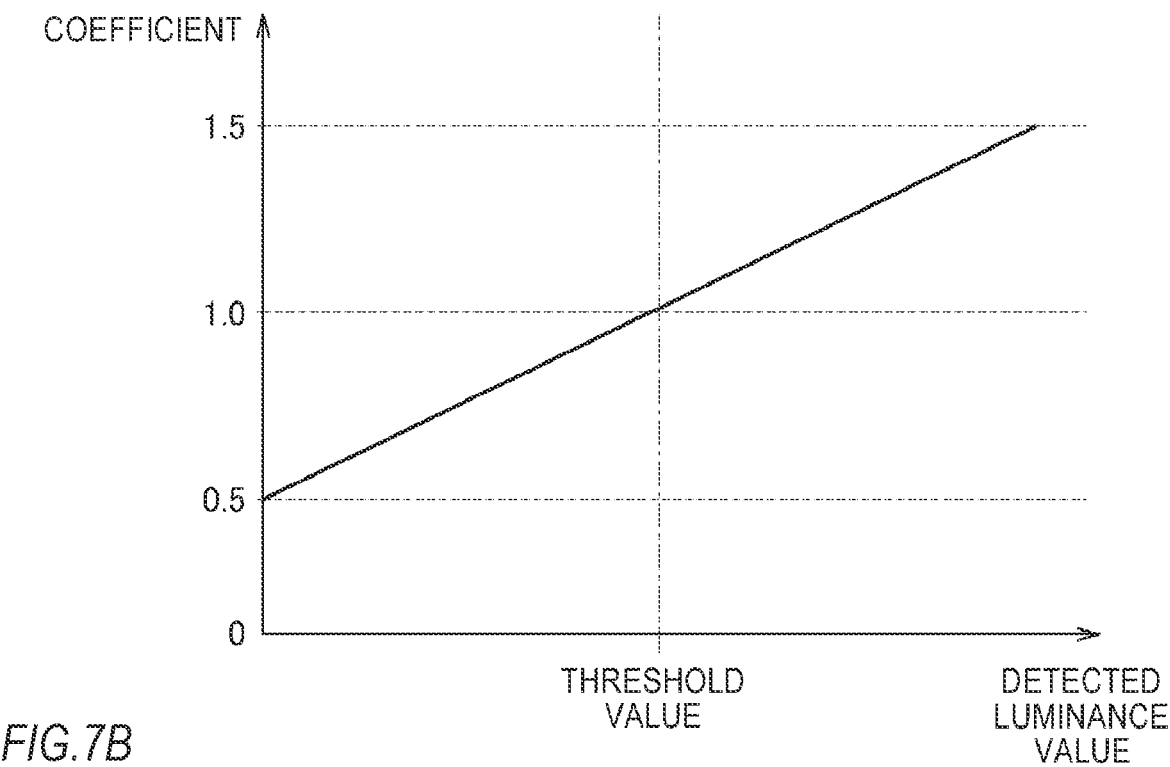
FIG. 7A illustrates a relation between a detected luminance value and a coefficient in a high contrast control that is executed by the vehicle lamp system according to the second exemplary embodiment.

Regarding the above issue, it is possible to avoid the lowering in visibility of the driver due to the polarization by using a reference illuminance value M and a coefficient, as follows. FIG. 7A illustrates a relation between a detected luminance value and a coefficient in a high contrast control that is executed by the vehicle lamp system according to the second exemplary embodiment, and FIG. 7B illustrates the relation between the detected luminance value and the set illuminance value in the high contrast control.

As shown in FIG. 7A, the illuminance setting unit 42 has a predetermined coefficient preset according to a detected luminance value. For a relatively high detected luminance value, a relatively great coefficient is set, and for a relatively low detected luminance value, a relatively small coefficient is set. The value of the coefficient may be appropriately set based on a result of a test or a simulation, considering a degree of improvement on the target detection accuracy and the like. Here, for example, the coefficient 1.0 is set for the threshold value of the detected luminance value, the coefficient 1.5 is set for the maximum luminance value, and the coefficient 0.5 is set for the minimum luminance value. The illuminance setting unit 42 is configured to set the coefficients for the individual areas R except the specific individual area R1, based on the detection result of the luminance analysis unit 14.

Figure 7B:
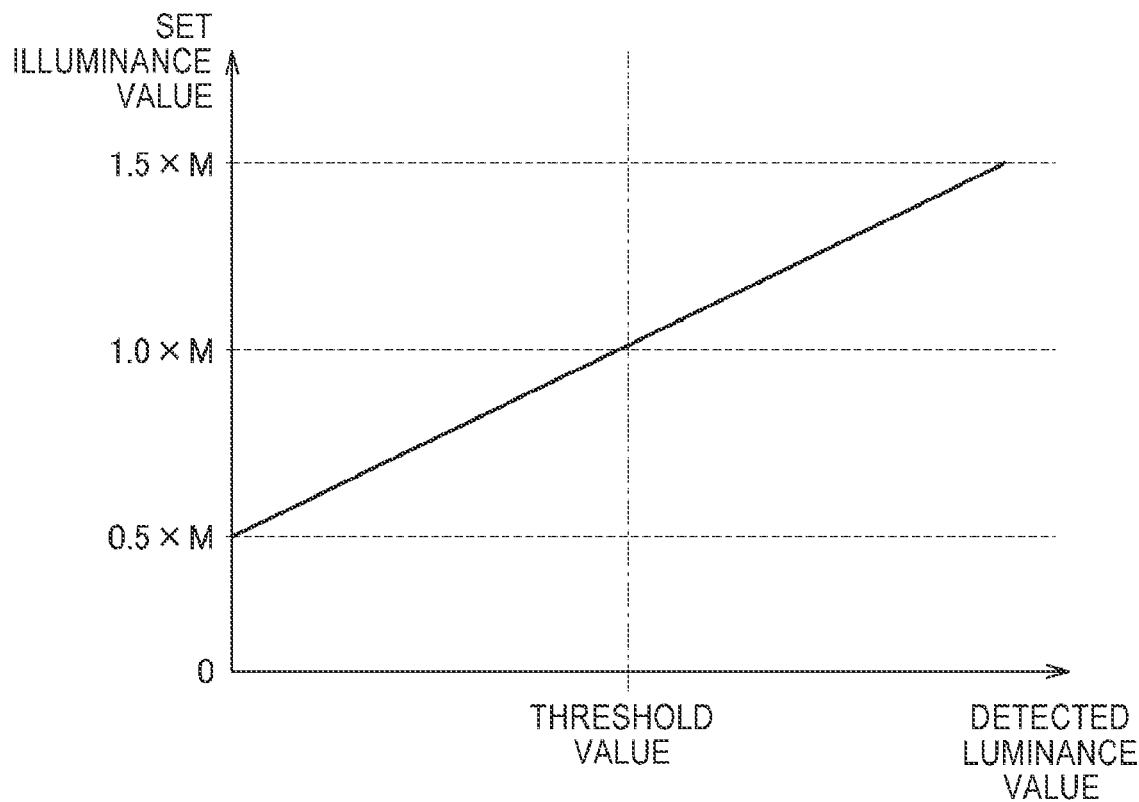
FIG. 7B illustrates the relation between the detected luminance value and the set illuminance value in the high contrast control.

As shown in FIG. 7B, the illuminance setting unit 42 has a preset predetermined reference illuminance value M. The illuminance setting unit 42 is configured to set the illuminance value of the individual area R by multiplying the reference illuminance value M by the coefficient set for each individual area R. Thereby, for the individual area R in which the detected luminance value is low, the low illuminance value is set, and for the individual area R in which the detected luminance value is high, the high illuminance value is set. The light source control unit 20 is configured to control the light source unit 10 based on the illuminance values set by the illuminance setting unit 42. As a result, a high contrast light distribution pattern enhancing the light-dark contrast of the radiation target object ahead of the host vehicle is formed. In the meantime, for example, the illuminance setting unit 42 is configured to form a light distribution pattern in which the illuminances of all the individual areas R except the specific individual area R1 are set to the reference illuminance value M, at the beginning of the high contrast control. In the meantime. "the predetermined range" may be an entire range or a partial range of luminances that can be detected by the luminance analysis unit 14. In FIGS. 7A and 7B, the entire range of luminances that can be detected by the luminance analysis unit 14 is set as "the predetermined range".

The illuminance setting unit 42 may be configured to set a new illuminance value by multiplying the currently set illuminance value of each individual area R by the coefficient, instead of the reference illuminance value M. In this case, the illuminance setting unit 42 has a lower limit and an upper limit of the preset illuminance value. When the calculated new illuminance value is equal to or higher than the lower limit or is equal to or lower than the upper limit, the illuminance setting unit 42 updates the current illuminance value with the new illuminance value, and when the calculated new illuminance value is below the lower limit or is above the upper limit, the illuminance setting unit 42 keeps the current illuminance value. In the meantime, when the illuminance setting unit 42 has at least the lower limit, it is possible to avoid the lowering in visibility of the driver due to the polarization of the illuminance value. For example, the illuminance setting unit 42 is configured to form a light distribution pattern in which the illuminances of all the individual areas R except the specific individual area R1 are made constant, at the beginning of the high contrast control.

Figure 8:
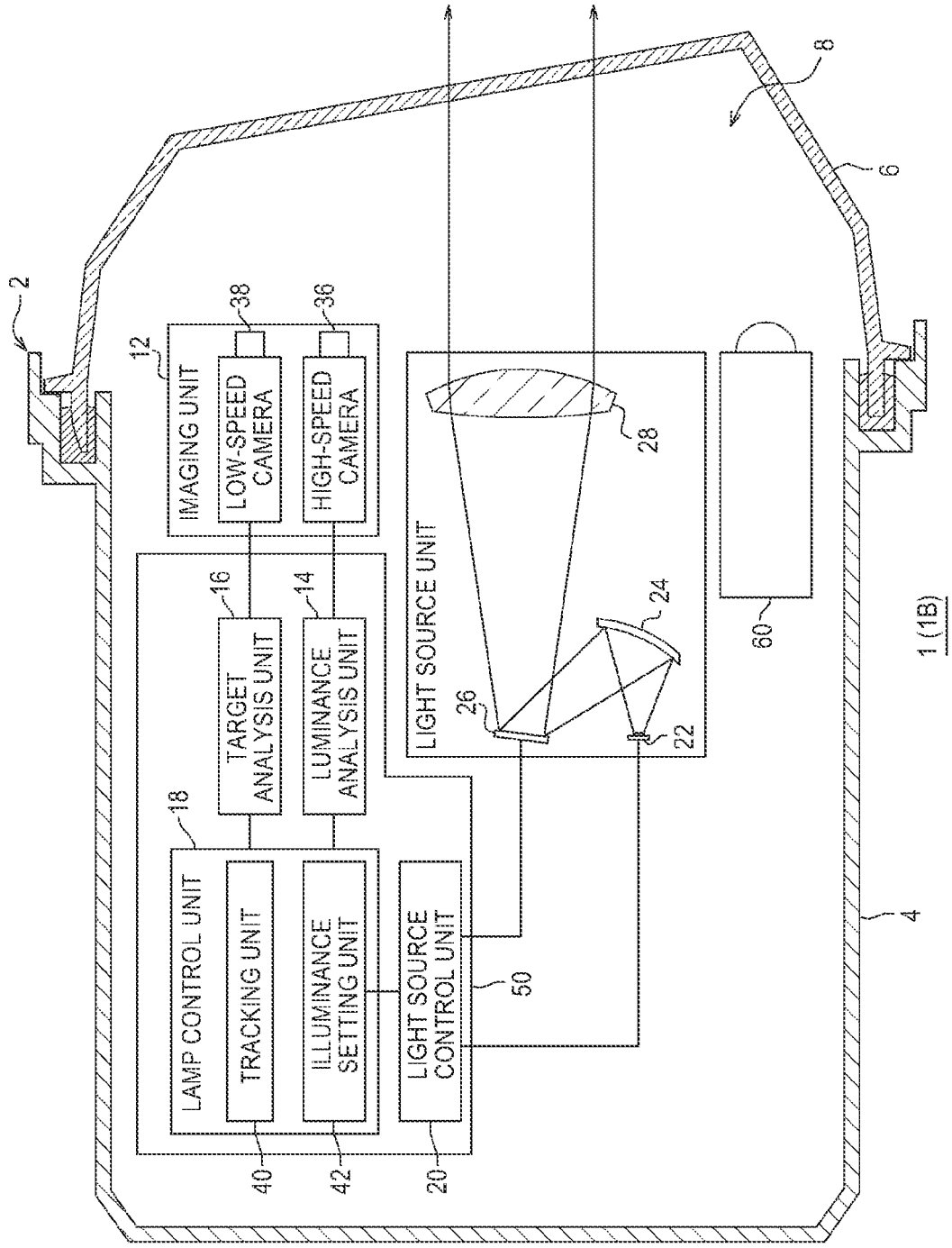
FIG. 8 illustrates a schematic structure of a modified embodiment of the vehicle lamp system according to the second exemplary embodiment.

The lowering in visibility of the driver due to the polarization can be avoided by providing another light source unit configured to be controlled independently of the light source unit 10, in addition to the light source unit 10 configured to form the high contrast light distribution pattern. FIG. 8 illustrates a schematic structure of a modified embodiment of the vehicle lamp system according to the second exemplary embodiment. As shown in FIG. 8, the vehicle lamp system 1 (1B) includes a lamp unit 60 as another light source unit, in addition to the light source unit 10, the imaging unit 12 and the control device 50. The light source unit 10 and the lamp unit 60 are independently controlled. For example, a light switch (not shown) provided to the vehicle is operated by the driver, so that turning on/off of the lamp unit 60 is switched and a type of the light distribution pattern to be formed is switched. The lamp unit 60 can form a light distribution pattern for low beam, a light distribution pattern for high beam and the like, which is known. In the below, a light distribution pattern that is to be formed by the lamp unit 60 is referred to as a usual light distribution pattern.

The illuminance setting unit 42 is configured to execute the high contrast control under situations where the usual light distribution pattern is formed by the lamp unit 60. The illuminance setting unit 42 is configured to set an illuminance value lower than the currently set illuminance value for the individual area R in which the luminance is low and to set an illuminance, value higher than the currently set illuminance value for the individual area R in which the luminance is high. The high-low degree of the illuminance value to be set can be appropriately set based on a result of a test or a simulation, considering a degree of improvement on the target detection accuracy and the like. In the meantime, when setting a new illuminance value, the above-described coefficient may be used. That is, a new illuminance value may be set by multiplying the currently set illuminance value by the coefficient. The light source control unit 20 is configured to control the light source unit 10 based on the illuminance values set by the illuminance setting unit 42. As a result, the high contrast light distribution pattern is superimposed on the usual light distribution pattern.

The high contrast light distribution pattern is formed, so that the light-dark contrast ahead of the host vehicle is enhanced. Even when the illuminance of each individual area R in the high contrast light distribution pattern is polarized, the usual light distribution pattern is designed to be radiated to the individual area R having low illuminance in the high contrast light distribution pattern, so that it is possible to secure the visibility of the driver.

In the meantime, for example, the illuminance selling unit 42 is configured to form a light distribution pattern in which the illuminances of all the individual areas R except the specific individual area R1 are made constant, at the beginning of the high contrast control. Alternatively, only the usual light distribution pattern is formed by the lamp unit 60, without forming the light distribution pattern by the light source unit 10. In this case, the luminance of each individual area R, which is obtained as a result of the radiation of the usual light distribution pattern, is used to form the high contrast light distribution pattern. The high contrast light distribution patterns of second time and thereafter may be determined under a situation in which only the usual light distribution pattern is formed, under a situation in which the usual light distribution pattern and the high contrast light distribution pattern are superimposed, or under a situation in which only the high contrast light distribution pattern is formed.

Third Exemplary Embodiment

A vehicle lamp system according to a third exemplary embodiment has substantially the same configuration as the vehicle lamp system according to the first exemplary embodiment, except that a hardware configuration configuring the control device 50 has further features. In the below, the vehicle lamp system of the third exemplary embodiment is described focusing on a characteristic configuration of the third exemplary embodiment, and the common configuration is simply described or the description thereof is omitted.

Figure 9:
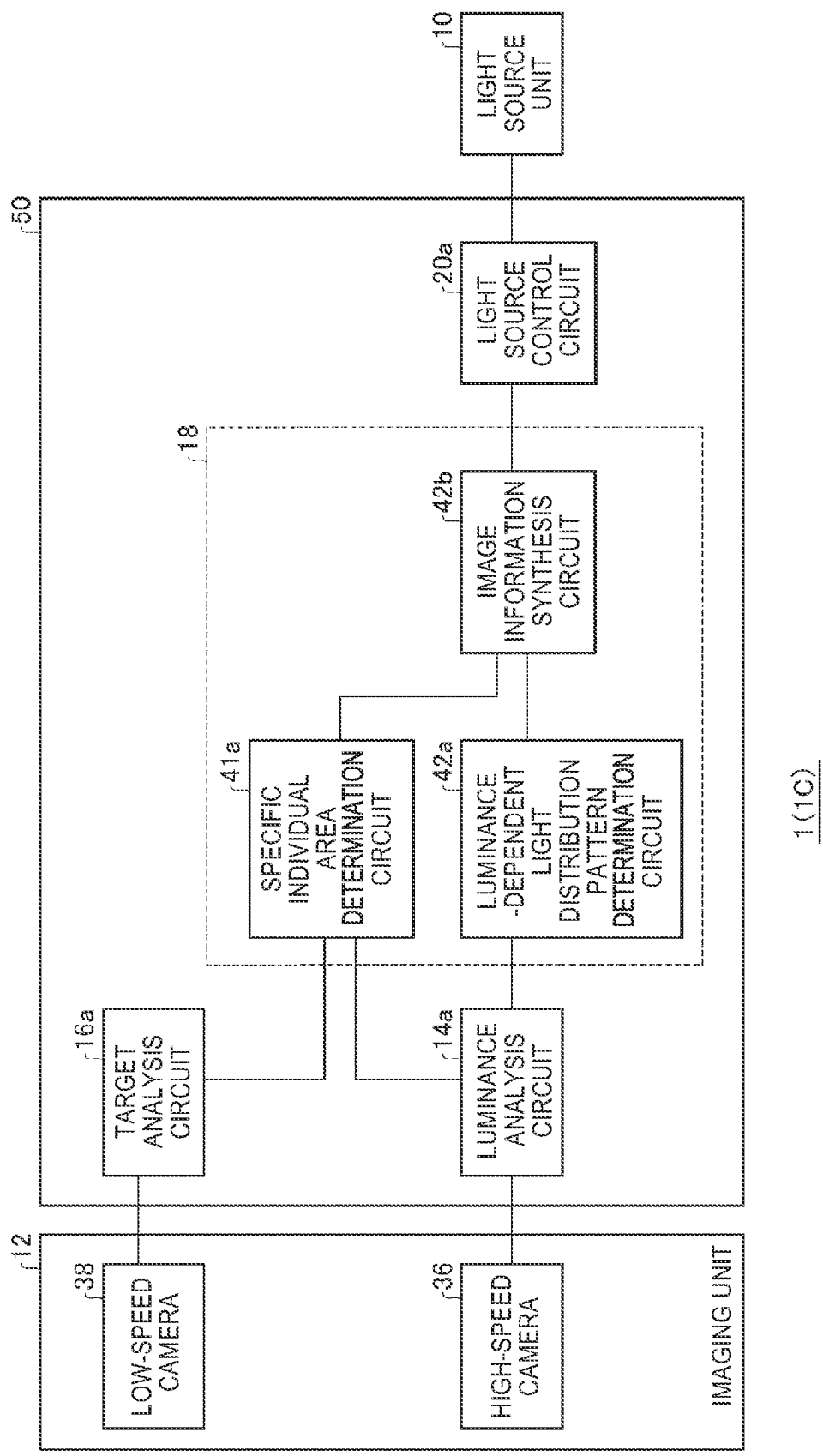
FIG. 9 is a schematic view illustrating a hardware configuration of a control device of the vehicle lamp system according to the third exemplary embodiment.

FIG. 9 is a schematic view illustrating a hardware configuration of a control device of the vehicle lamp system according to the third exemplary embodiment. The vehicle lamp system 1 (1C) of the third exemplary embodiment includes the light source unit 10, the imaging unit 12, and the control device 50, similarly to the first exemplary embodiment. The control device 50 has the luminance analysis unit 14, the target analysis unit 16, the lamp control unit 18, and the light source control unit 20, as the functional blocks. The lamp control unit 18 has the tracking unit 40 and the illuminance setting unit 42, as the functional blocks.

The control device 50 includes, as a hardware configuration, a luminance analysis circuit 14a, a target analysis circuit 16a, a specific individual area determination circuit 41aa luminance-dependent light distribution pattern determination circuit 42a, an image information synthesis circuit 42b, and a light source control circuit 20a.

The luminance analysis circuit 14a is an integrated circuit configuring the luminance analysis unit 14. The target analysis circuit 16a is an integrated circuit configuring a pail of the target analysis unit 16 and the tracking unit 40. That is, the target objects are detected by the target analysis circuit 16a. The specific target object is determined from the detected target objects. The light source control circuit 20a is an integrated circuit configuring the light source control unit 20.

The specific individual area determination circuit 41a (first integrated circuit) is an integrated circuit configuring another part of the tracking unit 40 and a part of the illuminance setting unit 42, That is, the luminance of the individual area R in which the specific target object is present is associated with the specific target object by the specific individual area determination circuit 41a. Then, displacement detection processing (tracking) of the specific target object is executed. The specific illuminance value is determined for the specific individual area R1 determined according to a position where the specific target object is present by the specific individual area determination circuit 41a. The information about the specific illuminance value that is generated by the specific individual area determination circuit 41a is hereinafter referred to as first image information.

The luminance-dependent light distribution pattern determination circuit 42a (second integrated circuit) and the image information synthesis circuit 42b are integrated circuits configuring another part of the illuminance setting unit 42. That is, the luminance-dependent light distribution pattern is determined by the luminance-dependent light distribution pattern determination circuit 42a. The information about the luminance-dependent light distribution pattern that is generated by the luminance-dependent light distribution pattern determination circuit 42a is hereinafter referred to as second image information. The luminance-dependent light distribution pattern is a light distribution pattern that is obtained as the illuminance value of each individual area is set depending on the luminance detected by the luminance analysis unit 14. The luminance-dependent light distribution pattern is, for example, the light distribution pattern (hereinafter, appropriately referred to as luminance-equalized light distribution pattern) to be set based on the constant luminance control described in the first exemplary embodiment. The luminance-dependent light distribution pattern is, for example, the high contrast light distribution pattern described in the second exemplary embodiment.

The first image information generated by the specific individual area determination circuit 41a and the second image information generated by the luminance-dependent light distribution pattern determination circuit 42a are synthesized by the image information synthesis circuit 42b. Thereby, the illuminance values for all the individual areas R, which include the specific illuminance value for the specific individual area R1, are determined.

As described above, in the third exemplary embodiment, the determination processing of the specific illuminance value for the specific individual area R1, and the determi- nation processing of the illuminance value for each individual area R, which is dependent on the luminance detected by the luminance analysis unit 14, i.e., the determination processing of the luminance-dependent light distribution pattern are executed in the separate integrated circuits. Thereby, it is possible to execute each processing at processing speed suitable for each processing, in particular, the higher processing speed is required for the determination processing of the specific illuminance, value, as compared to the determination processing of the luminance-dependent light distribution pattern. In the meantime, a relatively long time is required for the determination processing of the luminance-dependent light distribution pattern. Therefore, if the determination of the specific illuminance value and the determination of the luminance-dependent light distribution pattern are executed by the same integrated circuit, it is difficult to accelerate the determination processing speed of the specific illuminance value. In contrast, the respective processing is executed by the separate integrated circuits, so that it is possible to accelerate the determination processing speed of the specific illuminance value. Therefore, for example, when the specific target object is the oncoming vehicle 100, it is possible to further securely avoid the glare to be provided to the driver of the oncoming vehicle 100.

In order to execute the determination of the specific illuminance value and the determination of the luminance-dependent light distribution pattern at high speed by the same integrated circuit, a high-performance CPU and a large-capacity memory are required. In contrast, the respective processing is executed by the separate integrated circuits, so that it is possible to reduce the performance required for the integrated circuit. In the meantime, regarding the speeds of the respective processing, the processing in the specific individual area determination circuit 41*a* is fastest, the processing in the luminance-dependent light distribution pattern determination circuit 42*a* is next fastest, and the processing in the target analysis circuit 16*a* is slowest. The image information synthesis circuit 42*b* is configured to execute synthesis processing of the image information, in conformity to the processing speed of the fastest processing.

Preferably, the respective integrated circuits are mounted on a common wiring substrate, i.e., are formed as one board. The integrated circuits are formed as one board and the respective integrated circuits are electrically connected through a circuit wiring printed on the wiring substrate, so that it is possible to accelerate the communication speed between the respective integrated circuits, as compared to a configuration where the respective integrated circuits are mounted on separate substrates and are connected by wires. Also, it is possible to achieve the size reduction and cost reduction of the vehicle lamp system 1.

Fourth Exemplary Embodiment

A vehicle lamp system according to a fourth exemplary embodiment has substantially the same configuration as the vehicle lamp system according to the first or third exemplary embodiment, except that the luminance-dependent light distribution pattern is formed for only a part of the individual areas R except the specific individual area R1. In the below, the vehicle lamp system of the fourth exemplary embodiment is described focusing on a characteristic configuration of the fourth exemplary embodiment, and the common configuration is simply described or the description thereof is omitted.

Figure 10:
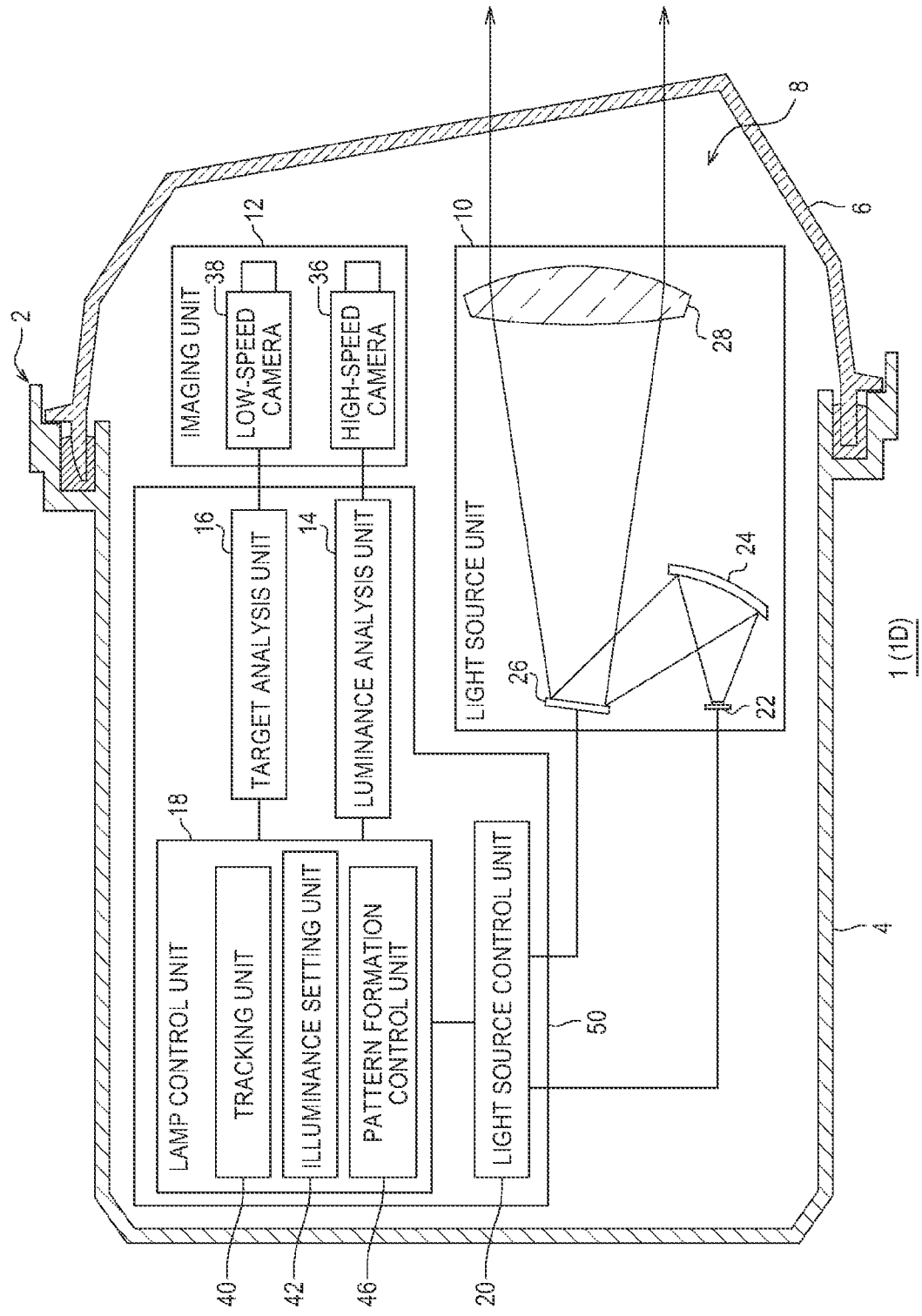
FIG. 10 illustrates a schematic configuration of the vehicle lamp system according to the fourth exemplary embodiment.

FIG. 10 illustrates a schematic configuration of the vehicle lamp system according to the fourth exemplary embodiment. In FIG. 10, some of the constitutional elements of the vehicle lamp system are shown as the functional blocks. The vehicle lamp system 1 (1D) of the fourth exemplary embodiment includes the light source unit 10, the imaging unit 12, and the control device 50, similarly to the first exemplary embodiment. The control device 50 includes the luminance analysis unit 14, the target analysis unit 16, the lamp control unit 18, and the light source control unit 20, as the functional blocks. The lamp control unit 18 has the tracking unit 40, the illuminance setting unit 42 and a pattern formation control unit 46, as the functional blocks.

The pattern formation control unit 46 is configured to determine a formation range of a luminance-dependent light distribution pattern in which illuminance values are set depending on the luminances detected by the luminance analysis unit 14, and a formation range of a luminance-independent light distribution pattern in which illuminance values are set independently of the luminances detected by the luminance analysis unit 14. The luminance-dependent light distribution pattern is the luminance-equalized light distribution pattern described in the first exemplary embodiment or the high contrast light distribution pattern described in the second exemplary embodiment, for example. The luminance-independent light distribution pattern is an illuminance-constant light distribution pattern in which the illuminance values of the light to be radiated to the respective individual areas R are the same, for example.

Therefore, the control device 50 is configured to form the luminance-dependent light distribution pattern for the individual areas R within a predetermined position range and to form the luminance-independent light distribution pattern for the other individual areas R. In this way, the individual areas R for which the luminance-dependent light distribution pattern is to be formed are limited, so that it is possible to accelerate the determination processing speed of the luminance-dependent light distribution pattern. Also, it is possible to reduce load to be applied to the control device 50 during the determination processing. Further, it is possible to divide an area ahead of the host vehicle into a plurality of areas and to form different light distribution patterns in the respective areas. Therefore, it is possible to form a light distribution pattern more suitable for a situation ahead of the host vehicle.

Figure 11A:
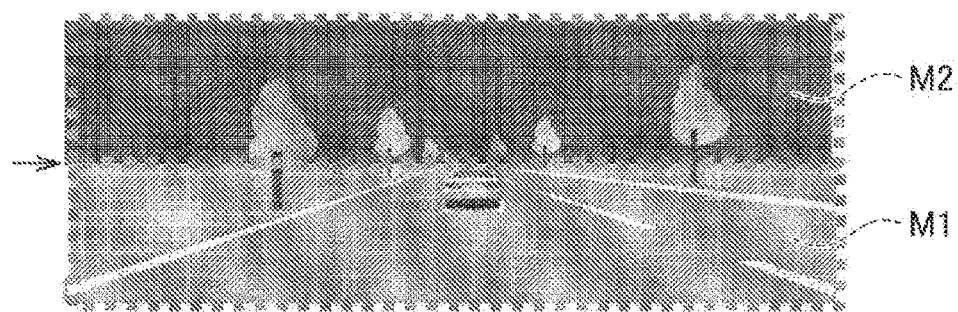
FIGS. 11A and 11B schematically illustrate a formation range of a luminance-dependent light distribution pattern and a formation range of a luminance-independent light distribution pattern.
Figure 11B:
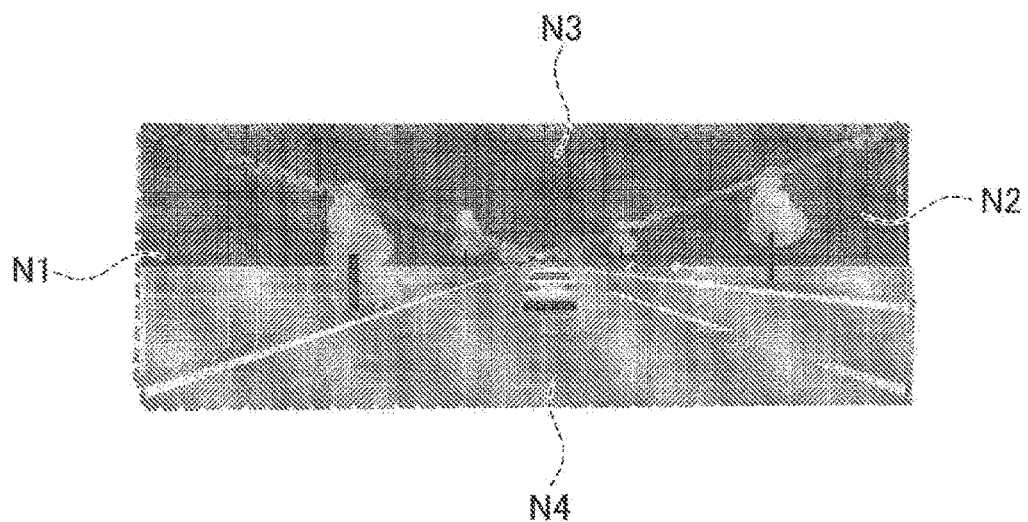

FIG. 11A and FIG. 11B schematically illustrate the formation range of the luminance-dependent light distribution pattern and the formation range of the luminance-independent light distribution pattern. For example, as shown in FIG. 11A, the pattern formation control unit 46 sets an area M1 below a horizontal line, as the formation range of the luminance-dependent light distribution pattern. The pattern formation control unit 46 sets an area M2 above the horizontal line, as the formation range of the luminance-independent light distribution pattern. Since the area M1 below the horizontal line has a high possibility that a target object to be recognized will exist therein, the luminance-dependent light distribution pattern is preferably formed. On the other hand, since the area M2 above the horizontal line has a low possibility that a target object to be recognized will exist therein, the luminance-independent light distribution pattern is formed.

For example, as shown in FIG. 11B, the pattern formation control unit 46 sets side areas N1, N2, which are located outside a traveling road surface and excludes the sky above the host vehicle, as the formation range of the luminance-dependent light distribution pattern. The pattern formation control unit 46 sets an area N3 of the sky above the host vehicle, as the formation range of the luminance-independent light distribution pattern. The pattern formation control unit 42 sets a traveling road surface area N4, as the formation range of the luminance-dependent light distribution pattern or the luminance-independent light distribution pattern. In many cases, the pedestrian 200 has a high priority as a target object to be recognized, Since the side areas N1, N2 have a high possibility that the pedestrian 200 will be present therein, the luminance-dependent light distribution pattern is formed. On the other hand, since the area N3 of the sky above the host vehicle has a low possibility that the pedestrian 200 will be present therein, the luminance-independent light distribution pattern is formed. The traveling road surface area N4 has a higher possibility that the pedestrian 200 will be present therein, as compared to the area, N3 of the sky above the host vehicle, but has a lower possibility that the pedestrian 200 will be present therein, as compared to the side areas N1, N2. Therefore, for the traveling road surface area N4, the light distribution pattern to be formed may be selected, depending on which is given priority the reduction in load applied to the control device 50 or the improvement on the safety of the driving.

The pattern formation control unit 46 may determine the areas M1, M2 and N1 to N4, based on the detection result of the target analysis unit 16, for example. As the luminance-independent light distribution pattern, a plurality of patterns is determined in advance according to the surrounding environments of the host vehicle (urban area, suburbs, motorway and the like), and the pattern formation control unit 46 determines the luminance-independent light distribution pattern to be formed. The pattern formation control unit 46 can obtain vehicle speed information from a vehicle speed sensor (not shown) mounted on a vehicle. The information about the surrounding environments of the host vehicle can be obtained from a car navigation system, a steering angle sensor, an illuminance sensor, image data of the imaging unit 12 and the like, which are mounted on the vehicle and are not shown.

Figure 12:
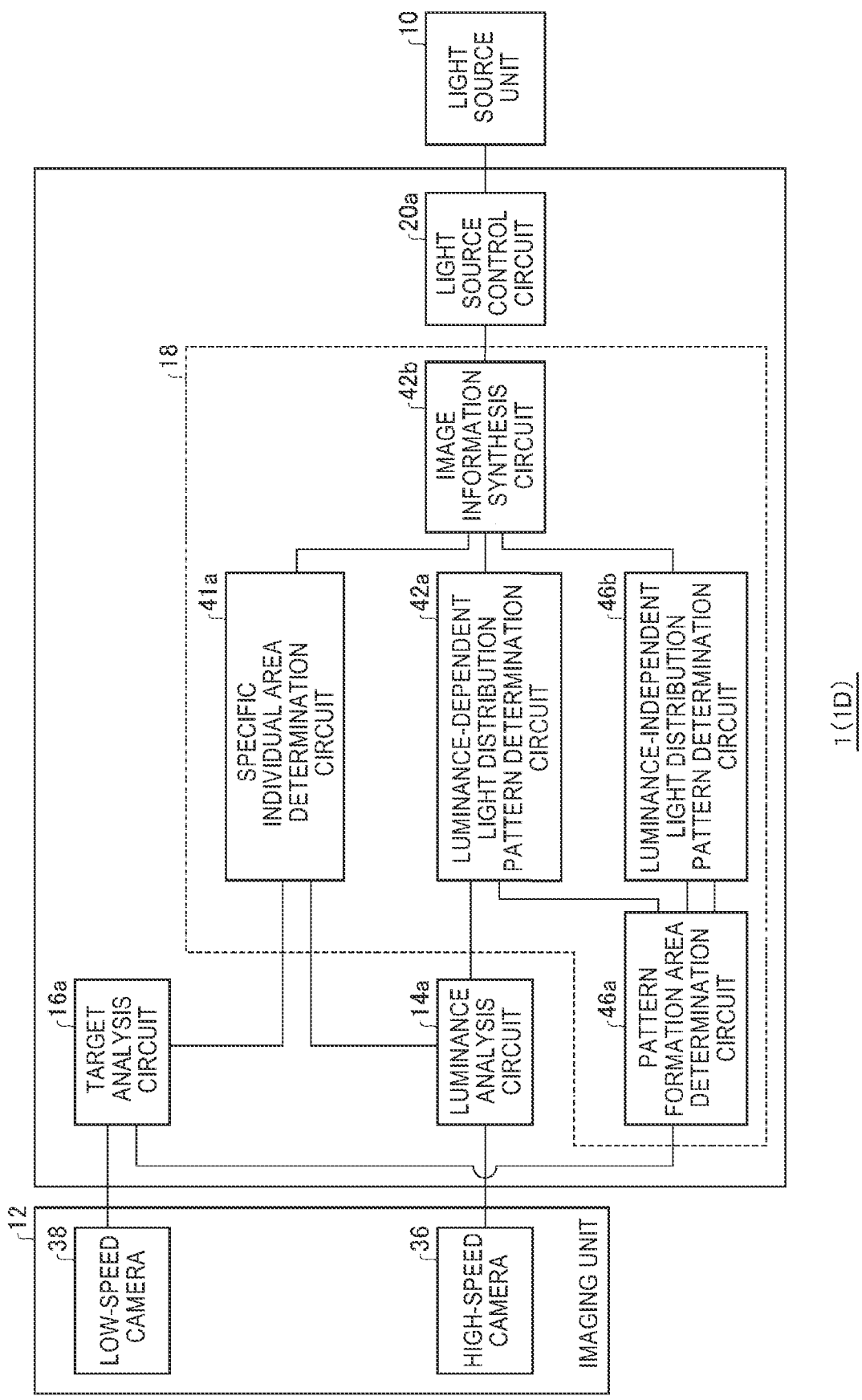
FIG. 12 is a schematic view illustrating a hardware configuration of a control device of the vehicle lamp system according to the fourth exemplary embodiment.

FIG. 12 is a schematic view illustrating a hardware configuration of a control device of the vehicle lamp system according to the fourth exemplary embodiment. The control device 50 of the fourth exemplary embodiment includes, as a hardware configuration, the luminance analysis circuit 14a, the target analysis circuit 16a, the specific individual area determination circuit 41a, the luminance-dependent light distribution pattern determination circuit 42a, the image information synthesis circuit 42b, a pattern formation area determination circuit 46a, a luminance-independent light distribution pattern determination circuit 46b, and the light source control circuit 20a. Since the circuits except the luminance-dependent light distribution pattern determination circuit 42a, the pattern formation area determination circuit 46a and the luminance-independent light distribution pattern determination circuit 46b are configured to execute substantially the same processing as the third exemplary embodiment, the detailed descriptions thereof are appropriately omitted.

The luminance analysis circuit 14a is an integrated circuit configuring the luminance analysis unit 14. The target analysis circuit 16a is an integrated circuit configuring a part of the target analysis unit 16 and the tracking unit 40. The light source control circuit 20a is an integrated circuit configuring the light source control unit 20. The specific individual area determination circuit 41a (first integrated circuit) is an integrated circuit configuring another part of the tracking unit 40 and a part of the illuminance setting unit 42. That is, in the specific individual area determination circuit 41a, the tracking of the specific target object is executed. The specific illuminance value for the specific individual area R1 is set, and the first image information is generated.

The pattern formation area determination circuit 46a and the luminance-independent light distribution pattern determination circuit 46b (third integrated circuit) are integrated circuits configuring the pattern formation control unit 46. The pattern formation area determination circuit 46a is configured to determine the formation range of the luminance-dependent light distribution pattern and the formation range of the luminance-independent light distribution pattern. The luminance-independent light distribution pattern determination circuit 46b is configured to determine the luminance-independent light distribution pattern to be formed. That is, for the individual area R present in the formation range of the luminance-independent light distribution pattern determined by the pattern formation area determination circuit 46a, the illuminance value is set without depending on the luminance detected by the luminance analysis unit 14. The information about the illuminance value generated in the luminance-independent light distribution pattern determination circuit 46b is hereinafter referred to as third image information.

The luminance-dependent light distribution pattern determination circuit 42a (second integrated circuit) and the image information synthesis circuit 42b are integrated circuits configuring another part of the illuminance setting unit 42. The luminance-dependent light distribution pattern determination circuit 42a is configured to set the illuminance value, depending on the luminance detected by the luminance analysis unit 14, and to generate the second image information, for the individual area R present in the formation range of the luminance-dependent light distribution pattern determined by the pattern formation area determination circuit 46a. Then, the first image information generated by the specific individual area determination circuit 41a, the second image information generated by the luminance-dependent light distribution pattern determination circuit 42a and the third image information generated by the luminance-independent light distribution pattern determination circuit 46b are synthesized in the image information synthesis circuit 42b. Thereby, the illuminance values for all the individual areas R, which include the specific illuminance value for the specific individual area R1, are determined.

In this way, according to the fourth exemplary embodiment, the determination processing of the specific illuminance value for the specific individual area R1, and the determination processing of the illuminance value for each individual area R, which is dependent on the luminance detected by the luminance analysis unit 14, i.e., the determination processing of the luminance-dependent light distribution pattern are executed in the separate integrated circuits. The formation area of the luminance-dependent light distribution pattern is limited to a partial area. Thereby, similarly to the vehicle lamp system 1 according to the third exemplary embodiment, it is possible to accelerate the determination processing speed of the specific illuminance value and the determination processing speed of the luminance-dependent light distribution pattern.

In the fourth exemplary embodiment, the determination processing of the luminance-independent light distribution pattern is executed in the integrated circuit different from those for the determination processing of the specific illuminance value and the determination processing of the luminance-dependent light distribution pattern. Thereby, it is possible to further accelerate the determination processing speed of the luminance-dependent light distribution pattern.

In the meantime, regarding the speeds of the respective processing, the processing in the specific individual area determination circuit 41a is fastest, the processing in the luminance-dependent light distribution pattern determination circuit 42a is next fastest, the processing in the target analysis circuit 16a is next fastest, and the processing in the luminance-independent light distribution pattern determination circuit 46b is slowest. The image information synthesis circuit 42b is configured to execute synthesis processing of the image information, in conformity to the processing speed of the fastest processing.

Figure 13A:
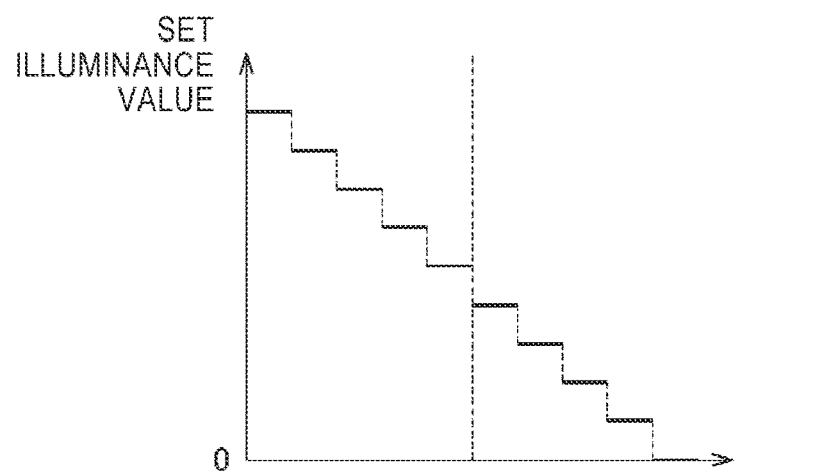
FIGS. 13A to 13C illustrate other examples of the relation between the detected luminance value and the set illuminance value in the constant luminance control.
Figure 13B:
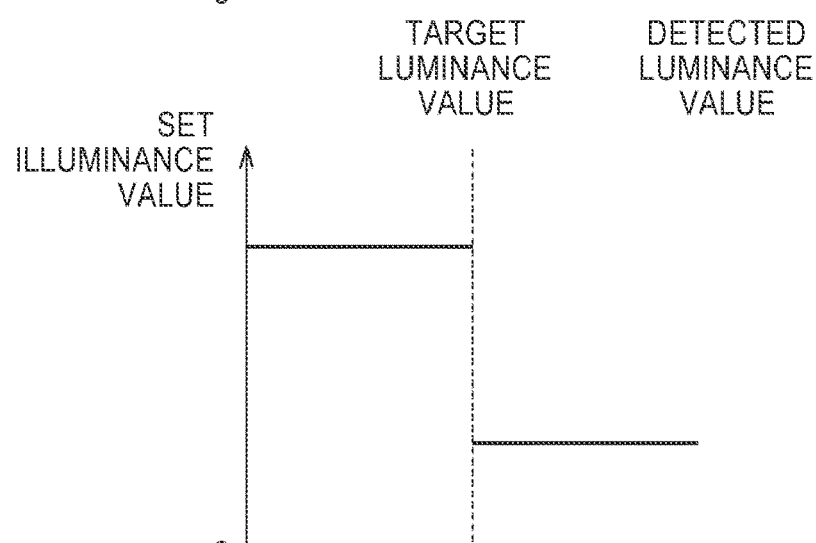
Figure 13C:
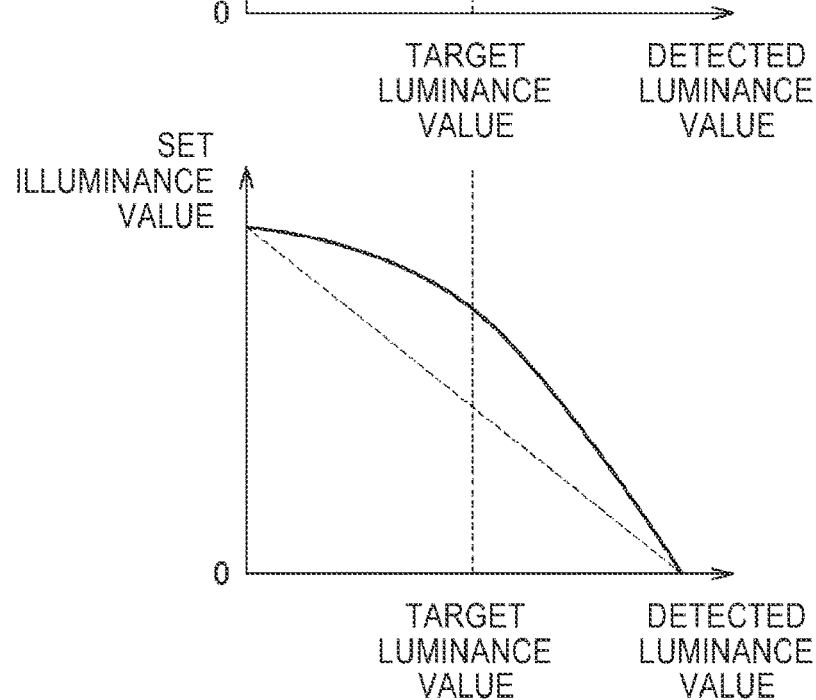

In the first to fourth exemplary embodiments, the relation between the detected luminance value and the set illuminance value in the constant luminance control may be set, as follows. FIGS. 13A to 13C illustrate other examples of the relation between the detected luminance value and the set illuminance value in the constant luminance control. That is, in the example of FIG. 4, the set illuminance value is changed continuously and linearly with respect to the detected luminance value. However, the relation is not particularly limited thereto, and the set illuminance value may be changed stepwise with respect to the detected luminance value, as shown in FIGS. 13A and 13B. Also, as shown in FIG. 13C, the set illuminance value may be changed curvedly with respect to the detected luminance value. In the meantime, the upward convex curve is shown in FIG. 13C but a downward convex curve is also possible.

Figure 14A:
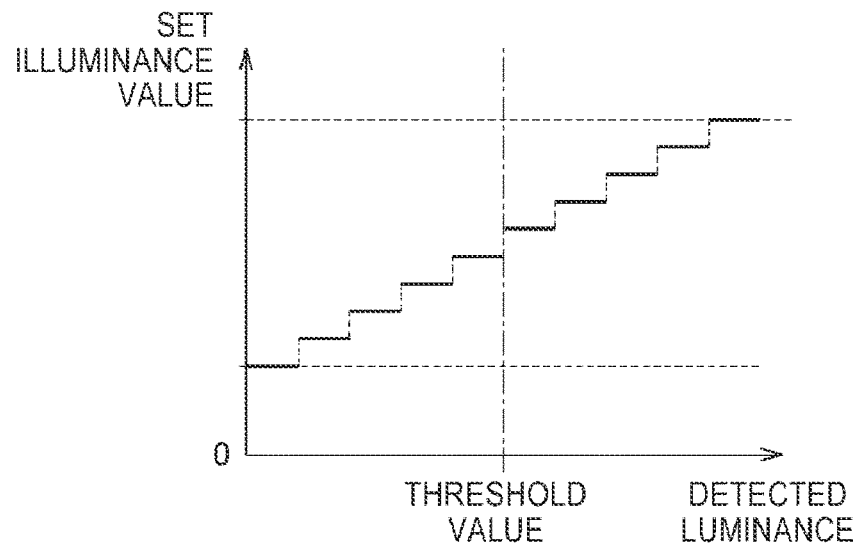
FIGS. 14A to 14C illustrate other examples of the relation between the detected luminance value and the set illuminance value in the high contrast control.
Figure 14B:
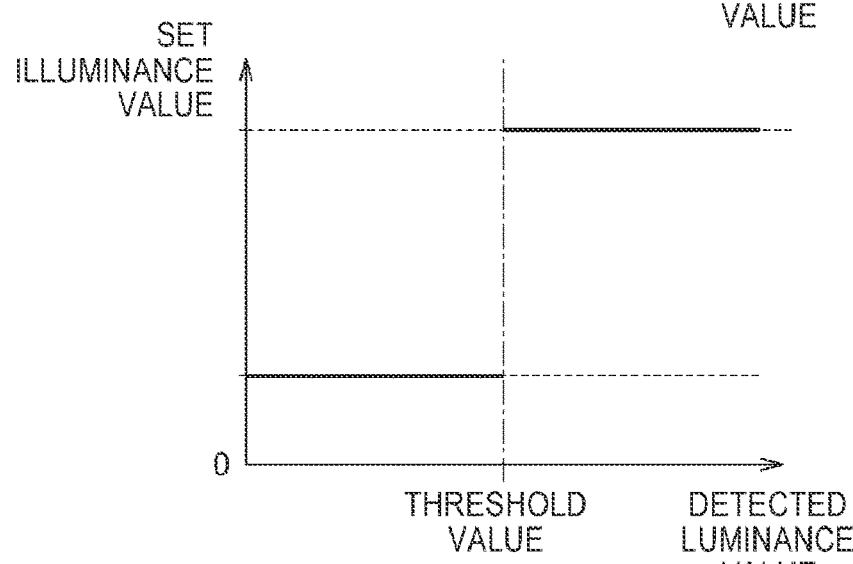
Figure 14C:
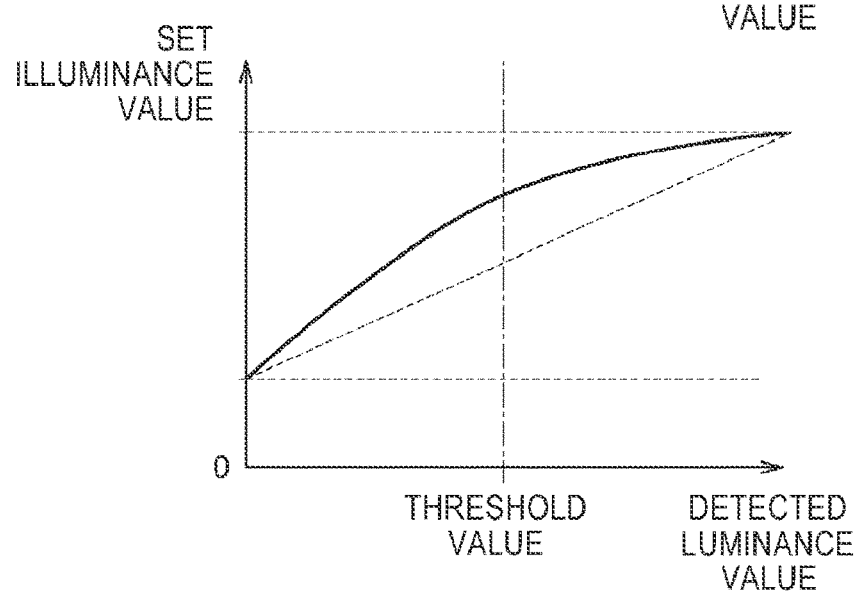

The relation between the detected luminance value and the set illuminance value in the high contrast control may also be set, as follows. FIGS. 14A to 14C illustrate other examples of the relation between the detected luminance value and the set illuminance value in the high contrast control. That is, in the example of FIG. 7B, the set illuminance value is changed continuously and linearly with respect to the detected luminance value. However, the relation is not particularly limited thereto, and the set illuminance value may be changed stepwise with respect to the detected luminance value, as shown in FIGS. 14A and 14B. Also, as shown in FIG. 14C, the set illuminance value may be changed curvedly with respect to the detected luminance value. In the meantime, the upward convex curve is shown in FIG. 14C but a downward convex curve is also possible. Since the relation between the detected luminance value and the coefficient is similar to the relation between the detected luminance value and the set illuminance value, it is apparent even though it is not shown.

The following aspects can also be included in one or more embodiments of the present invention.

A control device 50 of a vehicle lamp 2 includes:
a luminance analysis unit 14 configured to detect luminance of each of a plurality of individual areas R ahead of a host vehicle based on information obtained from an imaging mil 12 configured to take an image ahead of the host vehicle;
a target analysis unit 16 configured to detect target objects ahead of the host vehicle based on the information obtained from the imaging unit 12;
a tracking unit 40 configured to determine a specific target object from the target objects detected by the target analysis unit 16, and to detect displacement of the specific target object based on a detection result of the luminance analysis unit 14;
an illuminance setting unit 42 configured to set, based on the detection result of the luminance analysis unit 14 and a detection result of the tracking unit 40, an illuminance value of light to be radiated to each individual area R, which includes a specific illuminance value for a specific individual area R1 determined according to a position where the specific target object is present; and
a light source control unit 20 configured to control a light source unit 10 capable of individually adjusting the illuminance of the light to be radiated to each individual area R, based on the illuminance values set by the illuminance setting unit 42.

A control method of a vehicle lamp 2 including:
detecting a luminance of each of a plurality of individual areas R ahead of a host vehicle based on information obtained from an imaging unit 12 configured to take an image ahead of the host vehicle;
detecting target objects ahead of the host vehicle based on the information obtained from the imaging unit 2;
determining a specific target object front the detected target objects and detecting displacement the specific target object based on a detection result of the luminance,
setting, based on the detection result of the luminance and a detection result of the displacement, an illuminance value of light to be radiated to each individual area R, which includes a specific illuminance value for a specific individual area R1 determined according to a position where the specific target object is present; and
controlling a light source unit 10 capable of individually adjusting the illuminance of the light be radiated to each individual area R, based on the set illuminance values.

Fifth Exemplary Embodiment

Figure 15:
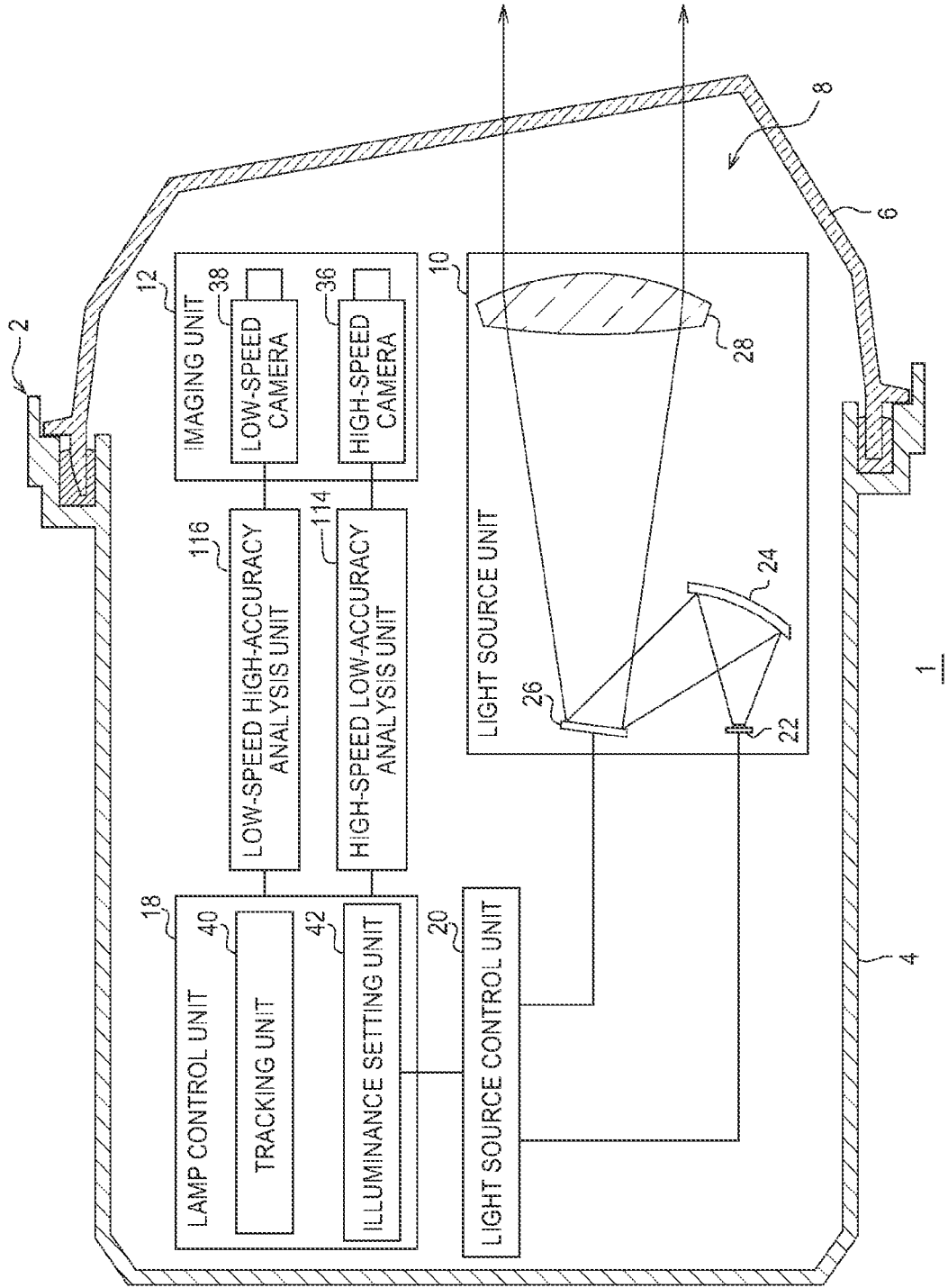
FIG. 15 illustrates a schematic configuration of the vehicle lamp system according to the fifth and sixth exemplary embodiments.

FIG. 15 illustrates a schematic configuration of a vehicle lamp system according to a fifth exemplary embodiment. In FIG. 15, some of the constitutional elements of the vehicle lamp system 1 are shown as the functional blocks. The functional blocks are implemented by a device and a circuit, including a CPU and a memory of a computer, as a hardware configuration, and are implemented by a computer program and the like, as a software configuration. It can be appreciated by one skilled in the art that the functional blocks are implemented in various forms by combinations of the hardware and the software.

The vehicle lamp system 1 is applied to a vehicle headlight device including a pair of headlight units arranged at left and light sides of a vehicle front. Since the pair of headlight units has substantially the same configuration, except bilaterally symmetrical structures, a structure of one headlight unit is shown as a vehicle lamp 2 in FIG. 15.

The vehicle lamp 2 of the vehicle lamp system 1 includes a lamp body 4 having an opening at a vehicle front side, and a light-transmitting cover 6 attached to cover the opening of the lamp body 4. The light-transmitting cover 6 is made of light-transmitting resin, glass or the like. In a lamp chamber 8 formed by the lamp body 4 and the light-transmitting cover 6, a light source unit 10, an imaging unit 12, a high-speed low-accuracy analysis unit 114 (image analysis unit), a low-speed high-accuracy analysis unit 116, a lamp control unit 18, and a light source control unit 20 are accommodated.

The light source unit 10 is a device capable of individually adjusting an illuminance (intensity) of light to be radiated to each of a plurality of individual areas (refer to FIG. 3) ahead of the host vehicle. The light source unit 10 includes a light source 22, a reflection optical member 24, a light deflection device 26, and a projection optical member 28. The respective parts are attached to the lamp body 4 by a support mechanism (not shown).

As the light source 22, a semiconductor light-emitting device such as an LED (Light emitting diode), an LD (Laser diode), an EL (Electroluminescence) device and the like, a lamp bulb, an incandescent lamp (halogen lamp), a discharge lamp, and the like can be used.

The reflection optical member 24 is configured to guide light emitted from the light source 22 to a reflective surface of the light deflection device 26. The reflection optical member 24 is configured by a reflecting mirror of which an inner surface is formed as a predetermined reflective surface. In the meantime, the reflection optical member 24 may be a solid light guiding member. When the light emitted from the light source 22 can be directly guided to the light deflection device 26 the reflection optical member 24 may not be provided.

The light deflection device 26 is arranged on an optical axis of the projection optical member 28, and is configured to selectively reflect the light emitted from the light source 22 toward the projection optical member 28. The light deflection device 26 is configured by a DMD (Digital Mirror Device), for example. That is, the light deflection device 26 has a plurality of micro mirrors aligned in an array (matrix) shape. By controlling angles of reflective surfaces of the plurality of micro mirrors, respectively, it is possible to selectively change a reflection direction of the light emitted from the light source 22. That is, the light deflection device 26 can reflect a part of the light emitted from the light source 22 toward the projection optical member 28 and the other light toward a direction in which the light is not efficiently used by the projection optical member 28. Here, the direction in which the light is not efficiently used can be construed as a direction in which the light is incident on the projection optical member 28 but does not mostly contribute to formation of a light distribution pattern or a direction toward a light absorption member (light shield member) (not shown), for example.

FIG. 2A is a front view illustrating a schematic configuration of the light deflection device 26, and FIG. 2B is a sectional view taken along a line A-A of the light deflection device shown in FIG. 2A. The light deflection device 26 has a structure as described in the first exemplary embodiment. FIG. 3 schematically illustrates an appearance ahead of the host vehicle. The correspondence between the plurality of individual areas R ahead of the host vehicle and the respective mirror elements 30, and the resolution of the micro mirror array 32 are as described in the first exemplary embodiment. The time necessary for the light source unit 10 to form one light distribution pattern is 0.1 to 5 ms, for example. That is, the light source unit 10 can change the light distribution pattern every 0.1 to 5 ms.

As shown in FIG. 15, the projection optical member 28 is configured by a free curve surface lens of which a front surface and a rear surface have free curve surface shapes, for example. The projection optical member 28 is configured to project a light source image, which is formed on a rear focal plane including a rear focus thereof, toward the front of the lamp, as a reverted image. The projection optical member 28 is arranged so that the rear focus thereof is located on an optical axis of the vehicle lamp 2 in the vicinity of the reflective surface of the micro mirror array 32. In the meantime, the projection optical member 28 may be a reflector.

The light emitted from the light source 22 is reflected on the reflection optical member 24 and is then radiated to the micro mirror array 32 of the light deflection device 26. The light deflection device 26 is configured to reflect the light toward the projection optical member 28 by a predetermined mirror element 30 located at the first reflection position. The reflected light travels ahead of the lamp through the projection optical member 28, and is radiated to each individual area R corresponding to each mirror element 30. Thereby, a light distribution pattern having a predetermined shape is formed ahead of the lamp.

The imaging unit 12 is a device configured to take an image ahead of the host vehicle. The imaging unit 12 includes a high-speed camera 36 and a low-speed camera 38. The high-speed camera 36 has a relatively high frame rate, for example 200 fps to 10000 fps (0.1 to 5 ms per one frame). On the other hand, the low-speed camera 38 has a relatively low frame rate, for example 30 fps to 120 fps (about 8 to 33 ms per one frame). Also, the high-speed camera 36 has a relatively low resolution, for example, 300,000 pixels to 5,000,000 pixels. On the other hand, the low-speed camera 38 has a relatively high resolution, for example, 5,000,000 or higher pixels.

The high-speed camera 36 and the low-speed camera 38 are configured to take an image of all the individual areas R. Image data obtained by the imaging unit 12 is transmitted to the high-speed low-accuracy analysis unit 114 and the low-speed high-accuracy analysis unit 116. The high-speed low-accuracy analysis unit 114 corresponds to the luminance analysis unit 14 of the first to fourth exemplary embodiments, and the low-speed high-accuracy analysis unit 116 corresponds to the target analysis unit 16 of the first to fourth exemplary embodiments.

The high-speed low-accuracy analysis unit 114 that is an image analysis unit is configured to detect luminance of each individual area R based on information (image data) obtained from the imaging unit 12. The high-speed low-accuracy analysis unit 114 of the fifth exemplary embodiment is configured to detect luminance of each individual area R based on information obtained from the high-speed camera 36.

The high-speed low-accuracy analysis unit 114 is configured to detect luminance of each individual area R ever 0.1 to 5 ms, for example. A detection result of the high-speed low-accuracy analysis unit 114, i.e., a signal indicative of the luminance information of the individual area R is transmitted to the lamp control unit 18.

The low-speed high-accuracy analysis unit 116 is configured to detect target objects ahead of the host vehicle based on the information Obtained from the imaging unit 12. The low-speed high-accuracy analysis unit 116 of the fifth exemplary embodiment is configured to detect the target objects based on the information obtained from the low-speed camera 38. The low-speed high-accuracy analysis unit 116 is configured to detect target objects every 50 ms, for example. As the target objects that are detected by the low-speed high-accuracy analysis unit 116, an oncoming vehicle 100, a pedestrian 200 and the like are exemplified, as shown in FIG. 3. A preceding vehicle, and an obstacle, a road marker, a road sign, a road shape and the like, which might interfere with traveling of the host vehicle, are also included in the target objects.

The low-speed high-accuracy analysis unit 116 can detect the target objects by using the known method including algorithm recognition, deep learning and the like. For example, the low-speed high-accuracy analysis unit 116 stores therein in advance a feature point indicative of the oncoming vehicle 100. When data including the feature point indicative of the oncoming vehicle 100 is present in the imaged data of the low-speed camera 38, the low-speed high-accuracy analysis unit 116 recognizes a position of the oncoming vehicle 100. "The feature point indicative of the oncoming vehicle 100" is a light spot 102 (refer to FIG. 3) having a predetermined light intensity or higher and appearing in an estimated presence area of a headlight of the oncoming vehicle 100, for example. The low-speed high-accuracy analysis unit 116 stores therein in advance feature points indicative of the pedestrian 200 and the other target objects. When data including the feature points is present in the imaged data of the low-speed camera 38, the low-speed high-accuracy analysis unit 116 recognizes positions of the target objects corresponding to the feature points. A detection result of the low-speed high-accuracy analysis unit 116, i.e., a signal indicative of the target information ahead of the host vehicle is transmitted to the lamp control unit 18.

The lamp control unit 18 is configured to determine a specific target object, detect displacement of the specific target object, set a specific individual area R1, set a target luminance value for each individual area R, which includes a specific target luminance value for the specific individual area R1, set an illuminance value of light to be radiated to each individual area R, and the like by using the detection results of the high-speed low-accuracy analysis unit 114 and/or the low-speed high-accuracy analysis unit 116. For example, the lamp control unit 18 includes a tracking unit 40, and an illuminance setting unit 42. The tracking unit 40 is configured to determine a specific target object from the target objects detected by the low-speed high-accuracy analysis unit 116. The tracking unit 40 is configured to detect displacement of the specific target object based on the detection result of the high-speed low-accuracy analysis unit 114. In the fifth exemplary embodiment, the oncoming vehicle 100 is set as the specific target object, for example.

Specifically, the tracking unit 40 is configured to aggregate the detection result of the high-speed low-accuracy analysis unit 114 and the detection result of the low-speed high-accuracy analysis unit 116. The tracking unit 40 is configured to associate the luminance of the individual area R, in which the light spot 102 of the oncoming vehicle 100 that is the specific target object is located, of the luminances of the respective individual areas R detected by the high-speed low-accuracy analysis unit 114 with the oncoming vehicle 100. The tracking unit 40 can detect displacement of the oncoming vehicle 100 that is the specific target object by recognizing a position of the luminance associated with the oncoming vehicle 100 in the detection result of the high-speed low-accuracy analysis unit 114 to be obtained thereafter. The tracking unit 40 is configured to execute determination processing of the specific target object every 50 ms, for example. Also, the tracking unit 40 is configured to execute displacement detection processing (tracking) of the specific target object every 0.1 to 5 ms, for example.

The illuminance setting unit 42 is configured to set a target luminance value of each individual area R and an illuminance value according to the target luminance value of light to be radiated to each individual area R, based on the detection result of the high-speed low-accuracy analysis unit 114 and the detection result of the tracking unit 40. For the specific individual area R1, which is determined according to a position where the specific target object is present, of the individual areas R, a specific target luminance value is set.

The illuminance setting unit 42 is configured to set the specific individual area R1, based on a presence position of the oncoming vehicle 100 that is the specific target object. For example, the illuminance setting unit 42 is configured to set the specific individual area R1, based on position information of the oncoming vehicle 100 included in the detection result of the tracking unit 40. For the setting of the specific individual area R1, for example, the illuminance setting unit 42 is configured to set a vertical direction distance b having a preset predetermined ratio to a horizontal direction distance a (refer to FIG. 3) between the two light spots 102 corresponding to the headlights of the oncoming vehicle 100, and to set an individual area R overlapping a dimension range of breadth a×length b, as the specific individual area R1 (refer to FIG. 3). In the specific individual area R1, the individual area R overlapping a driver of the oncoming vehicle is included.

The illuminance setting unit 42 is configured to set a specific target luminance value for the specific individual area R1. The illuminance setting unit 42 is configured to set target luminance values for the other individual areas R except the specific individual area R1. For example, the illuminance setting unit 42 is configured to set the target luminance values to be the same, except the specific target luminance value. That is, the illuminance setting unit executes constant luminance control.

The illuminance setting unit 42 is configured to recognize displacement of the specific individual area R1 based on the detection result of the tracking unit 40 and to update the position information of the specific individual area R1. The illuminance setting unit is configured to update the target luminance value of each individual area R, which includes the specific target luminance value for the specific individual area R1. The processing by the tracking unit 40 and the processing by the illuminance setting unit 42 are executed at least temporarily in parallel.

The illuminance setting unit 42 of the fifth exemplary embodiment is configured to set different target luminance values, according to at least one of a traveling place and a traveling time zone of the host vehicle. For example, a relatively low target luminance value is set for a relatively bright street, and a relatively high target luminance value is set for relatively dark suburbs. A low target luminance value is set in the daytime, an intermediate target luminance value is set at the evening, and a high target luminance value is set at night. That is, the illuminance setting unit 42 is configured to change the target luminance value according to the brightness around the host vehicle so that the front of the host vehicle is to be optimally bright. The illuminance setting unit 42 can obtain the information about the traveling place and the traveling time zone of the host vehicle from a navigation system (not shown) and the like, for example.

The illuminance setting unit 42 is configured to set an illuminance value of light to be radiated from the light source unit 10 to each individual area R, based on the target luminance value of each individual area R and the detection result of the high-speed low-accuracy analysis unit 114. The illuminance setting unit 42 is configured to transmit a signal indicative of the illuminance value of each individual area R to the light source control unit 20. The illuminance setting unit 42 is configured to set the target luminance value and the illuminance value every 0.1 to 5 ms, for example.

The light source control unit 20 is configured to control the light source unit 110 based on the illuminance values set by the illuminance setting unit 42. The light source control unit 20 is configured to control turning on/off of the light source 22 and on/off switching of each mirror element 30. The light source control unit 20 is configured to adjust a time ratio (width or frequency) of the on-state of each mirror element 30, based on the illuminance value of the light to be radiated to each individual area R. Thereby, the illuminance of the light to be radiated to each individual area R can be adjusted. The light source control unit 20 is configured to transmit a drive signal to the light source 22 and/or the light deflection device 26 every 0.1 to 5 ms, for example.

The light is radiated from the light source unit 10 based on the illuminance values set by the illuminance setting unit 42, and an actual luminance value of each individual area R is resultantly detected by the high-speed low-accuracy analysis unit 114. Then, the illuminance setting unit 42 is configured to again set an illuminance value based on the detection result.

Figure 16:
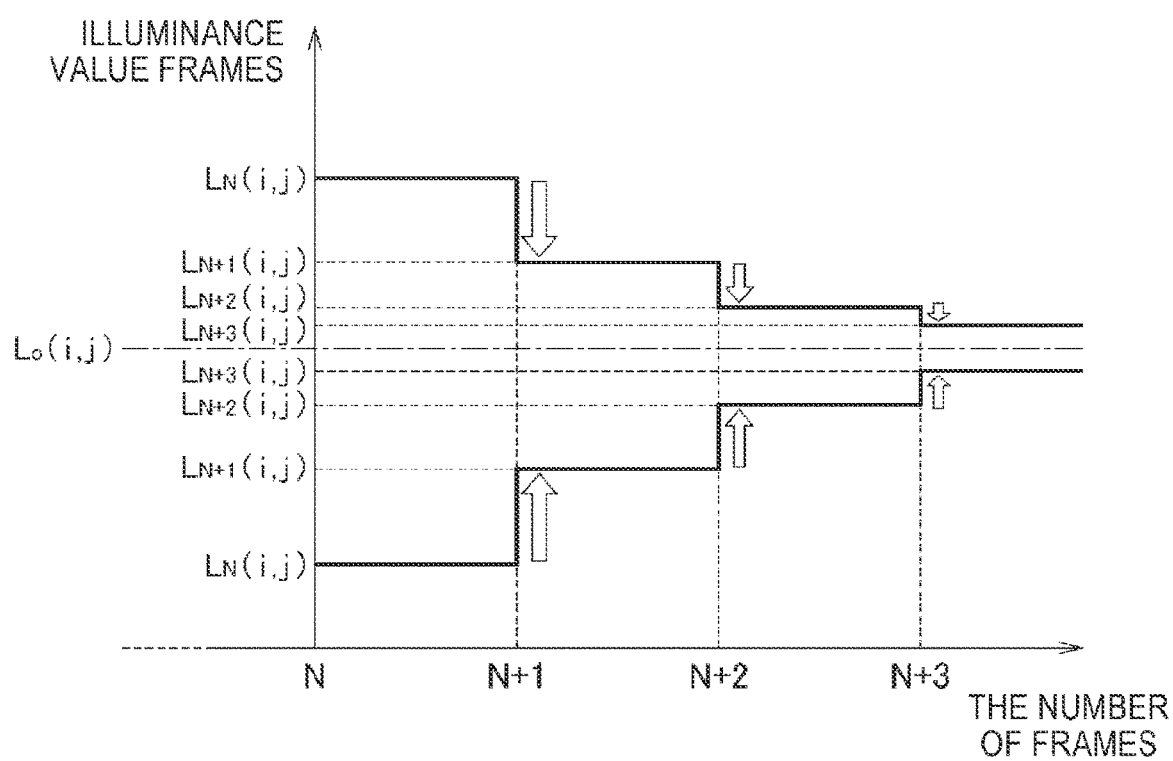
FIG. 16 illustrates an update manner of an illuminance value.

The setting of the illuminance value by the illuminance setting unit 42 is more specifically described. FIG. 16 illustrates an update aspect of the illuminance value. First, the illuminance setting unit 42 sets the target illuminance value $L_O$ (i, j) for each individual area R. "(i, j)" indicates position, coordinates of any individual area R in the image data of the imaging unit 12.

The target illuminance value $L_O$ (i, j) means an illuminance value at which the luminance value of the individual area R located at the position coordinates (i, j) becomes the target luminance value when the light having the illuminance value is radiated. For example, the illuminance setting unit 42 stores therein in advance a conversion table in which the target luminance values and the target illuminance values are associated with each other and can set the target illuminance value based on the conversion table. The target illuminance values are set by 256 gradations, for example.

The illuminance setting unit 42 sets, as a presently set illuminance value, an illuminance value of which a difference from the target illuminance value $L_O$ (i, j) is smaller than a difference between a previously set illuminance value and the target illuminance value $L_O$ (i, j) and which is deviated from the target illuminance value $L_O$ (i, j). The previously set illuminance value is an illuminance value of the light currently radiated from the light source unit 10, for example, an illuminance value $L_N$ (i, j) of N-th frame. The presently set illuminance value is an illuminance value of light to be radiated next time from the light source unit 10, for example, an illuminance value $L_{N+1}$ (i, j) of (N+1)-th frame. That is, the illuminance value to be newly set is closer to the target illuminance value than the previous illuminance value but is different from the target illuminance value.

As the illuminance setting unit 42 repeats the above setting of the illuminance value, the actual luminance of each individual area R becomes gradually closer to the target luminance value. By executing the control, it is possible to suppress an interaction (positive feedback) between the light source unit 10 and the imaging unit 12.

Specifically, the illuminance setting unit 42 compares the illuminance value $L_N$ (i, j) of N-th frame and the target illuminance value $L_O$ (i, j). When the illuminance value $L_N$ (i, j) is smaller than the target illuminance value $L_O$ (i, j), the illuminance setting unit sets the illuminance value $L_{N+1}$ (i, j) of (N+1)-th frame, based on the following Equation (1).

$$L_{N+1}(i,j) = L_N(i,j) - \beta \times (L_N(i,j) - L_O(i,j)) \quad \text{Equation (1)}$$

When the illuminance value $L_N$ (i, j) is greater than the target illuminance value $L_O$ (i, j), the illuminance setting unit sets the illuminance value $L_{N+1}$ (i, j) of (N+1)-th frame, based on the following Equation (2).

$$L_{N+1}(i,j) = L_N(i,j) - \beta \times (i,j) - L_O(i,j)) \quad \text{Equation (2)}$$

When the illuminance value $L_N$ (i, j) is the same as the target illuminance value $L_O$ (i, j), the illuminance setting unit sets the illuminance value $L_{N+1}$ (i,j) of (N+1)-th frame, based on the following Equation (3).

$$L_{N+1}(i,j) = L_N(i,j) \quad \text{Equation (3)}$$

α in the equation (1) and β in the equation (2) are gain constants to be set independently of each other. Also, α and β are set to values greater than 0 and smaller than 1. Also, α and β are set to two decimal places, for example. Therefore, according to the Equation (1), the illuminance value $L_{N+1}$ (i, j), which is closer to the target illuminance value $L_O$ (i, j) than the illuminance value $L_N$ (i, j) by a value obtained by multiplying the difference between the target illuminance value $L_O$ (i, j) and the illuminance value $L_N$ (i, j) of N-th frame by the gain constant α, is obtained. Similarly, according to the Equation (2), the illuminance value $L_{N+1}$ (i, j), which is closer to the target illuminance value $L_O$ (i, j) than the illuminance value $L_N$ (i, j) by a value obtained by multiplying the difference between the target illuminance value $L_O$ (i, j) and the illuminance value $L_{N+1}$ (i, j) of N-th frame by the gain constant β, is obtained.

When the illuminance value $L_N$ (i, j) of N-th frame coincides with the target illuminance value $L_O$ (i, j), the illuminance value (i, j) of (N+1)-th frame is also kept as the target illuminance value $L_O$ based on the Equation (3).

The illuminance setting unit 42 of the fifth exemplary embodiment is configured to reduce the difference between the previously set illuminance value and the presently set illuminance value, as the difference between the target luminance value and the actual luminance becomes smaller. In other words, the illuminance setting unit 42 switches the values of α and Ii when calculating the illuminance value $L_{N+1}$ (i, j) of (N+1)-th frame, according to the difference between the target illuminance value $L_O$ (i, j) and the illuminance value $L_N$ (i, j) of N-th frame, i.e., a value of $|L_O$ (i, j)–$L_N$ (i, j)|.

The illuminance setting unit 42 sets the values of α and β to be great when the difference is relatively large, and sets the values of α and β to be small when the difference is relatively small. Therefore, the values of α and β become gradually smaller in order of (N+1)-th frame, (N+2)-th frame, (N+3)-th frame . . . . Thereby, when the difference between the target illuminance value and the current illuminance value is large, it is possible to bring the next illuminance value closer to the target luminance value, as compared to a case where the difference is small.

The switching of α and β is executed in several steps, for example, 2 to 5 steps. The number of switching steps can be selected by the illuminance setting unit 42 based on the magnitude of the difference between the target illuminance value $L_O$ (i, j) and the illuminance value $L_N$ (i, j) of N-th frame. For example, the illuminance setting unit 42 may store therein in advance a conversion table in which the magnitude of the difference and the number of switching steps of α and β are associated with each other, and select the number of switching steps of α and β based on the conversion table. For example, when the difference between the target illuminance value $L_O$ (i, j) and the illuminance value $L_N$ (i, j) of N-th frame is relatively large, the illuminance setting unit 42 selects the greater number of switching steps of α and β, and when the difference is relatively small, the illuminance setting unit 42 selects the smaller number of switching steps. In this way, the number of switching steps of α and β is selected, so that it is possible to implement the similar illuminance change, when the difference is large and when the difference is small.

When the target illuminance value $L_O$ (i, j) is constant until the illuminance setting unit 42 switches α and β by the set number of switching steps, the illuminance setting unit 42 sets α and β to 1 only upon the final switching of α and β. Thereby, the calculated illuminance value coincides with the target illuminance value $L_O$ (i, j). When the target illuminance value $L_O$ (i, j) is changed until the illuminance setting unit 42 switches α and β by the set number of switching steps, the number of switching steps of α and β is again set so as to approach a new target illuminance value $L_O$ (i, j), α and β are set to values greater than 0 and smaller than 1, and the calculation of the illuminance value is repeated. In the meantime, the illuminance value to be first calculated, i.e., the illuminance value $L_1$ (i, j) of first frame is set as a value deviating from the target illuminance value $L_O$ (i, j) by a preset fixed value, for example.

The target illuminance value $L_O$ (i, j), the gain constants α, β, and the number of switching steps of α and β can be independently set for each individual area R.

By the above configuration, the vehicle lamp system 1 can form a light distribution pattern including a plurality of partial illumination areas. Each of the plurality of partial illumination areas is formed when the corresponding mirror element 30 is on. The vehicle lamp system 1 can form various light distribution patterns by switching the on/off states of the respective mirror elements 30.

The vehicle lamp system 1 is configured to execute an ADB (Adaptive Driving Beam) control of forming an optimal light distribution pattern according to a position of the specific target object ahead of the host vehicle. For example, the illuminance setting unit 42 sets the specific target luminance value "0" for the specific individual area R1 to be determined according to a position where the oncoming vehicle 100 is present and sets the target luminance value "1" for the other individual areas R. This setting is referred to as first luminance information. The illuminance setting unit 42 sets the target luminance value "2" for all the individual areas R according to the constant luminance control. This setting is referred to as second luminance information. Then, the illuminance setting unit 42 performs an AND operation for the first luminance information and the second luminance information. Thereby, luminance information in which the specific target luminance value "0" is set for the specific individual area R1 and the target luminance value "2" is set for the other individual areas R is generated.

Then, the illuminance setting unit 42 sets the target illuminance value "0" for the specific individual area R1 for which the specific target luminance value "0" is set. That is, the light to the specific individual area R1 is shielded. The luminance of the individual area R, in which an object such as a streetlamp configured to self-emit light exists, of the respective individual areas R except the specific individual area R1 does not have a difference from the target luminance value or is equal to or greater than the target luminance value. Therefore, the illuminance setting unit 42 sets the target illuminance value "0" for the corresponding individual area R, and shields the light. Since the luminance of the individual area R, in which an object such as a road marker, a delineator, a reflection plate and the like having high light reflectivity exists, has a smaller difference from the target luminance value, as compared to the other individual areas R, a relatively small target illuminance value is set for the corresponding individual area. That is, the light to the corresponding individual area R is reduced. In this way, the light distribution pattern of which the illuminance of each area is set is formed ahead of the host vehicle, so that the light is not radiated to a driver of the oncoming vehicle 100 and the individual areas R except the specific individual area R1 have the same brightness, as seen from a driver of the host vehicle or the imaging unit 12.

FIG. 5A and FIG. 5B are flowcharts illustrating an example of the ADB control that is executed in the vehicle lamp system according to the fifth exemplary embodiment. FIG. 6A and FIG. 6B are flowcharts illustrating another example of the ADB control that is executed in the vehicle lamp system according to the fifth exemplary embodiment. These flows are as described in the first exemplary embodiment, except that the luminance analysis unit 14 and the target analysis unit 16 are respectively interpreted as the high-speed low-accuracy analysis unit 114 and the low-speed high-accuracy analysis unit 116, and the illuminance value closer to the target illuminance value $L_O$ (i, j) than the previous illuminance value is set in step S206 and step S408.

As described above, the vehicle lamp system 1 according to the filth exemplary embodiment includes the light source unit 10, the imaging unit 12, the high-speed low-accuracy analysis unit 114 as the image analysis unit, the illuminance setting unit 42, and the light source control unit 20. The light source unit 10 can individually adjust the illuminance of the light to be radiated to each of the plurality of individual areas R. The high-speed low-accuracy analysis unit 114 is configured to detect the luminance of each individual area R. The illuminance setting unit 42 is configured to set the target luminance value of each individual area R and set the illuminance value of light to be radiated to each individual area R. The light source control unit 20 is configured to control the light source unit 10 based on the illuminance values set by the illuminance setting unit 42.

The illuminance setting unit 42 is configured to set, as a new illuminance value, an illuminance value of which a difference hum the to get illuminance value is smaller than a difference between a previously set illuminance value and the target illuminance value and which is deviated from the target illuminance value. Thereby, the illuminance setting unit 42 gradually brings the actual luminance of each individual area R close to the target luminance value. In this way, the illuminance value is set so that the actual luminance value is to stepwisely approach the target luminance value. Therefore, as compared to a configuration where the actual luminance value is made to coincide with the target luminance value by one change of the illuminance value, it is possible to suppress an interaction between the light source unit 10 and the imaging unit 12 configured to take an image ahead of the host vehicle radiated with the light source unit 10. Thereby, it is possible to suppress an output of the light source unit 10 from being unstable (oscillating) and to improve the formation accuracy of the light distribution pattern in the vehicle lamp 2. Also, it can be avoided that the driver of the host vehicle feels uncomfortable due to a rapid change in the light distribution pattern.

The illuminance setting unit 42 is configured to reduce a difference between the previously set illuminance value and the presently set illuminance value as a difference between the target luminance value and the actual luminance decreases. Therefore, as the current illuminance value is farther from the target illuminance value, an amount of change in the illuminance value is larger. Thereby, when the difference between the target illuminance value and the current illuminance value is large, it is possible to bring the next illuminance value closer to the target luminance value. As a result, while executing the control of making the illuminance value approach stepwise the target illuminance value, it is possible to bring the light distribution pattern to be formed close to the target light distribution pattern in a shorter time.

The illuminance setting unit 42 is configured to set the different target luminance values according to at least one of the traveling place and the traveling time zone of the host vehicle. Thereby, it is possible to radiate the light having intensity appropriate to the brightness around the host vehicle from the light source unit 10. As a result, it is possible to suppress the useless power consumption in the vehicle lamp 2.

The vehicle lamp system 1 of the fifth exemplary embodiment further includes the low-speed high-accuracy analysis unit 116 configured to detect target objects ahead of the host vehicle, and the tracking unit 40 configured to determine a specific target object from the target objects detected by the low-speed high-accuracy analysis unit 116 and to detect displacement of the specific target object based on a detection result of the high-speed low-accuracy analysis unit 114. The illuminance setting unit 42 is configured to set a specific target luminance value for a specific individual area R1 determined according to a position where the specific target object is present and to set the target luminance values to be the same, except the specific target luminance value.

The low-speed high-accuracy analysis unit 116 can detect the target objects with high accuracy. However, since a relatively long time is required for image processing, the analysis speed is slow. Therefore, if the ADB control is executed based on only the analysis result of the low-speed high-accuracy analysis unit 116, when the specific target object is the oncoming vehicle 100, for example, it is possible to form a light distribution pattern where a light shield area is narrowed and visibility of a driver of the host vehicle is improved. However it is difficult to make the light shield area follow up the displacement of the oncoming vehicle 100 with high accuracy.

In the meantime, since the high-speed low-accuracy analysis unit 114 configured to execute simple luminance detection requires a relatively short time for image processing, it is possible to perform high-speed analysis. However, since the target detection accuracy is low, it is difficult to correctly recognize a presence position of the target object. Therefore, if the ADB control is executed based on only the analysis result of the high-speed low-accuracy analysis unit 114, it is necessary to set a wide light shield area of the light distribution pattern, which costs the visibility of the driver of the host vehicle.

In contrast, according to the vehicle lamp system 1 of the fifth exemplary embodiment, a position where the oncoming vehicle 100 is present is recognized with high accuracy and the light distribution pattern is determined by the combination of the low-speed high-accuracy analysis unit 116, which is a low-speed advanced image analysis means, and the high-speed low-accuracy analysis unit 114, which is a simple high-speed image analysis means. Therefore, it is possible to improve the radiation accuracy of light in the vehicle lamp 2, in other words, the formation accuracy of the light distribution pattern. As a result, it is possible to realize both the avoidance of the glare to the driver of the oncoming vehicle 100 and the visibility of the driver of the host vehicle in a higher level.

The illuminance setting unit 42 of the fifth exemplary embodiment is configured to set the target luminance values to be the same, except the specific target luminance value. By executing the constant luminance control, it is possible to improve the target detection accuracy of the low-speed high-accuracy analysis unit 116. As a result, it is possible to further improve the radiation accuracy of light in the vehicle lamp.

The imaging unit 12 of the fifth exemplary embodiment includes the high-speed camera 36 and the low-speed camera 38. The high-speed low-accuracy analysis unit 114 is configured to detect the luminance based on the information obtained from the high-speed camera 36, and the low-speed high-accuracy analysis unit 116 is configured to detect the target objects based on the information obtained from the low-speed camera 38. In this way, the cameras are respectively allotted to the high-speed low-accuracy analysis unit 114 and the low-speed high-accuracy analysis unit 116, so that it is possible to adopt the dedicated camera for performance required for each image analysis. In general, a camera having performances required for the image analyses of the high-speed low-accuracy analysis unit 114 and the low-speed high-accuracy analysis unit 116 is expensive. Therefore, according to the fifth exemplary embodiment, it is possible to reduce the costs of the imaging unit 12 and the vehicle lamp system 1.

Sixth Exemplary Embodiment

FIG. 15 illustrates a schematic configuration of a vehicle lamp system according to a sixth exemplary embodiment. In FIG. 15, some of the constitutional elements of the vehicle lamp system 1 are shown as the functional blocks. The functional blocks are implemented by a device and a circuit, including a CPU and a memory of a computer, as a hardware configuration, and are implemented by a computer program and the like, as a software configuration. It can be appreciated by one skilled in the art that the functional blocks are implemented in various forms by combinations of the hardware and the software.

The vehicle lamp system 1 is applied to a vehicle headlight device including a pair of headlight units arranged at left and light sides of a vehicle front. Since the pair of headlight units has substantially the same configuration, except bilaterally symmetrical structures, a structure of one headlight unit is shown as a vehicle lamp 2 in FIG. 15.

The vehicle lamp 2 of the vehicle lamp system 1 includes a lamp body 4 having an opening at a vehicle front side, and a light-transmitting cover 6 attached to cover the opening of the lamp body 4. The light-transmitting cover 6 is made of light-transmitting resin, glass or the like. In a lamp chamber 8 formed by the lamp body 4 and the light-transmitting cover 6, a light source unit 10, an imaging unit 12, a high-speed low-accuracy analysis unit 114, a low-speed high-accuracy analysis unit 116, a lamp control unit 18, and a light source control unit 20 are accommodated.

The light source unit 10 is a device capable of individually adjusting an illuminance (intensity) of light to be radiated to each of a plurality of individual areas (refer to FIG. 3) ahead of the host vehicle. The light source unit 10 includes a light source 22, a reflection optical member 24, a light deflection device 26, and a projection optical member 28. The respective parts are attached to the lamp body 4 by a support mechanism (not shown).

As the light source 22, a semiconductor light-emitting device such as an LED (Light emitting diode), an LD (Laser diode), an EL (Electroluminescence) device and the like, a lamp bulb, an incandescent lamp (halogen lamp), a discharge lamp, and the like can be used.

The reflection optical member 24 is configured to guide light emitted from the light source 22 to a reflective surface of the light deflection device 26. The reflection optical member 24 is configured by a reflecting mirror of which an inner surface is formed as a predetermined reflective surface. In the meantime, the reflection optical member 24 may be a solid light guiding member. When the light emitted from the light source 22 can be directly guided to the light deflection device 26, the reflection optical member 24 may not be provided.

The light deflection device 26 is arranged on an optical axis of the projection optical member 28, and is configured to selectively reflect the light emitted from the light source 22 toward the projection optical member 28. The light deflection device 26 is configured by a DMD (Digital Mirror Device), for example. That is, the light deflection device 26 has a plurality of micro mirrors aligned in an array (matrix) shape. By controlling angles of reflective surfaces of the plurality of micro mirrors, respectively, it is possible to selectively change a reflection direction of the light emitted from the light source 22. That is, the light deflection device 26 can reflect a part of the light emitted from the light source 22 toward the projection optical member 28 and the other light toward a direction in which the light is not efficiently used by the projection optical member 28. Here, the direction in which the light is not efficiently used can be construed as a direction in which the light is to be incident on the projection optical member 28 but does not mostly contribute to formation of a light distribution pattern or a direction toward a light absorption member (light shield member) (not shown), for example.

FIG. 2A is a front view illustrating a schematic configuration of the light deflection device 26, and FIG. 2B is a sectional view taken along a line A-A of the light deflection device shown in FIG. 2A. The light deflection device 26 has a structure as described in the first exemplary embodiment. FIG. 3 schematically illustrates an appearance ahead of the host vehicle. The correspondence between the plurality of individual areas R ahead of the host vehicle and the respective mirror elements 30, and the resolution of the micro mirror array 32 are as described in the first exemplary embodiment. The time necessary for the light source unit 10 to form one light distribution pattern is 0.1 to 5 ms, for example. That is, the light source unit 10 can change the light distribution pattern every 0.1 to 5 ms.

As shown in FIG. 15, the projection optical member 28 is configured by a free curve surface lens of which a front surface and a rear surface have free curve surface shapes, for example. The projection optical member 28 is configured to project a light source image, which is formed on a rear focal plane including a rear focus thereof, toward the front of the lamp, as a reverted image. The projection optical member 28 is arranged so that the rear focus thereof is located on an optical axis of the vehicle lamp 2 in the vicinity of the reflective surface of the micro mirror array 32. In the meantime, the projection optical member 28 may be a reflector.

The light emitted from the light source 22 is reflected on the reflection optical member 24, and is then radiated to the micro mirror array 32 of the light deflection device 26. The light deflection device 26 is configured to reflect the light toward the projection optical member 28 by a predetermined mirror element 30 located at the first reflection position. The reflected light travels ahead of the lamp through the projection optical member 28, and is radiated to each individual area R corresponding to each mirror element 30. Thereby, a light distribution pattern having a predetermined shape is formed ahead of the lamp.

The imaging unit 12 is a device configured to take an image ahead of the host vehicle. The imaging unit 12 includes a high-speed camera 36 and a low-speed camera 38. The high-speed camera 36 has a relatively high frame rate, for example 200 fps to 10000 fps (0.1 to 5 ms per one frame). On the other hand, the low-speed camera 38 has a relatively low frame rate, for example 30 fps to 120 fps (about 8 to 33 ms per one frame). Also, the high-speed camera 36 has a relatively low resolution, for example, 300,000 pixels to 5,000,000 pixels. On the other hand, the low-speed camera 38 has a relatively high resolution, for example, 5,000,000 or higher pixels.

The high-speed camera 36 and the low-speed camera 38 are configured to take an image of all the individual areas R. Image data obtained by the imaging unit 12 is transmitted to the high-speed low-accuracy analysis unit 114 and the low-speed high-accuracy analysis unit 116. The high-speed low-accuracy analysis unit 114 corresponds to the luminance analysis unit 14 of the first to fourth exemplary embodiments, and the low-speed high-accuracy analysis unit 116 corresponds to the target analysis unit 16 of the first to fourth exemplary embodiments.

The high-speed low-accuracy analysis unit 114 is configured to detect luminance of each individual area R based on information (image data) obtained from the imaging unit 12. The high-speed low-accuracy analysis unit 114 of the sixth exemplary embodiment is configured to detect luminance of each individual area R, based on information obtained from the high-speed camera 36. The high-speed low-accuracy analysis unit 114 is configured to detect luminance of each individual area R every 0.1 to 5 ms, for example. A detection result of the high-speed low-accuracy analysis unit 114, i.e., a signal indicative of the luminance information of the individual area R is transmitted to the lamp control unit 18.

The low-speed high-accuracy analysis unit 116 is configured to detect target objects ahead of the host vehicle based on the information obtained from the imaging unit 12. The low-speed high-accuracy analysis unit 116 of the sixth exemplary embodiment is configured to detect the target objects based on the information to be obtained from the low-speed camera 38. The low-speed high-accuracy analysis unit 116 is configured to detect target objects every 50 ms, for example. As the target objects that are detected by the low-speed high-accuracy analysis unit 116, an oncoming vehicle 100, a pedestrian 200 and the like are exemplified, as shown in FIG. 3. A preceding vehicle, and an obstacle, a road marker a road sign, a road shape and the like, which might interfere with traveling of the host vehicle, are also included in the target objects.

The low-speed high-accuracy analysis unit 116 can detect the target objects by using the known method including algorithm recognition, deep learning and the like. For example, the low-speed high-accuracy analysis unit 116 stores therein in advance a feature point indicative of the oncoming vehicle 100. When data including the feature point indicative of the oncoming vehicle 100 is present in the imaged data, of the low-speed camera 38, the low-speed high-accuracy analysis unit 116 recognizes a position of the oncoming vehicle 100. "The feature point indicative of the oncoming vehicle 100" is a light spot 102 (refer to FIG. 3) having a predetermined light intensity or higher and appearing in an estimated presence area of a headlight of the oncoming vehicle 100, for example. The low-speed high-accuracy analysis unit 116 stores therein in advance feature points indicative of the pedestrian 200 and the other target objects. When data including the feature points are present in the imaged data of the low-speed camera 38, the low-speed high-accuracy analysis unit 116 recognizes positions of the target objects corresponding to the feature points. A detection result of the low-speed high-accuracy analysis unit 116, i.e., a signal indicative of the target information ahead of the host vehicle is transmitted to the lamp control unit 18.

The lamp control unit 18 is configured to determine a specific target object, detect displacement of the specific target object, set a specific individual area R1, set a target luminance value for each individual area R, which includes a specific target luminance value for the specific individual area R1, set an illuminance value of light to be radiated to each individual area R, and the like by using the detection results of the high-speed low-accuracy analysis unit 114 and/or the low-speed high-accuracy analysis unit 116. For example, the lamp control unit 18 includes a tracking unit 40, and an illuminance setting unit 42. The tracking unit 40 is configured to determine a specific target object from the target objects detected by the low-speed high-accuracy analysis unit 116. The tracking unit 40 is configured to detect displacement of the specific target object based on the detection result of the high-speed low-accuracy analysis unit 114. In the sixth exemplary embodiment, the oncoming vehicle 100 is set as the specific target object, for example.

Specifically, the tracking unit 40 is configured to aggregate the detection result of the high-speed low-accuracy analysis unit 114 and the detection result of the low-speed high-accuracy analysis unit 116. The tracking unit 40 is configured to associate the luminance of the individual area R, in which the light spot 102 of the oncoming vehicle 100 that is the specific target object is located, of the luminances of the respective individual areas R detected by the high-speed low-accuracy analysis unit 114 with the oncoming vehicle 100. The tracking unit 40 can detect displacement of the oncoming vehicle 100 that is the specific target object by recognizing a position of the luminance associated with the oncoming vehicle 100 in the detection result of the high-speed low-accuracy analysis unit 114 to be obtained thereafter. The tracking unit 40 is configured to execute determination processing of the specific target object every 50 ms, for example. Also, the tracking unit 40 is configured to execute displacement detection processing (tracking) of the specific target object every 0.1 to 5 ms, for example.

The illuminance setting unit 42 is configured to set a target luminance value of each individual area R and an illuminance value according to the target luminance value of light to be radiated to each individual area R, based on the detection result of the high-speed low-accuracy analysis unit 114 and the detection result of the tracking unit 40. For the specific individual area R1, which is determined according to a position where the specific target object is present, of the individual areas R, a specific target luminance value is set.

The illuminance setting unit 42 is configured to set the specific individual area R1, based on a presence position of the oncoming vehicle 100 that is the specific target object. For example, the illuminance setting unit 42 is configured to set the specific individual area R1, based on position information of the oncoming vehicle 100 included in the detection result of the tracking unit 40, For the setting of the specific individual area R1, for example, the illuminance setting unit 42 is configured to set a vertical direction distance h having a preset predetermined ratio to a horizontal direction distance a (refer to FIG. 3) between the two light spots 102 corresponding to the headlights of the oncoming vehicle 100, and to set an individual area R overlapping a dimension range of breadth a x length h, as the specific individual area R1 (refer to FIG. 3). In the specific individual area R1, the individual area R overlapping a driver of the oncoming vehicle is included.

The illuminance setting unit 42 is configured to set a specific target luminance value for the specific individual area, R1. The illuminance setting unit 42 is configured to set target luminance values for the other individual areas R except the specific individual area R1. For example, the illuminance setting unit 42 is configured to set the target luminance values to be the same, except the specific target luminance value, That is, the illuminance setting unit executes constant luminance control. By executing the constant luminance control, it is possible to improve the target detection accuracy of the low-speed high-accuracy analysis unit 116. As a result, it is possible to further improve the radiation accuracy of light in the vehicle lamp 2.

The illuminance setting unit 42 is configured to recognize displacement of the specific individual area R1 based on the detection result of the tracking unit 40, and to update the position information of the specific individual area R1. The illuminance setting unit is configured to update the target luminance value of each individual area R, which includes the specific target luminance value for the specific individual area R1. The processing by the tracking unit 40 and the processing by the illuminance setting unit 42 are executed at least temporarily in parallel.

The illuminance setting unit 42 is configured to set an illuminance value of light to be radiated from the light source unit 10 to each individual area R, based on the target luminance value of each individual area R and the detection result of the high-speed low-accuracy analysis unit 114. The illuminance setting unit 42 is configured to transmit a signal indicative of the illuminance value of each individual area R to the light source control unit 20. The illuminance setting unit 42 is configured to set the target luminance value and the illuminance value every 0.1 to 5 ms, for example.

In the meantime, the illuminance setting unit 42 may be configured to change the target luminance value according to brightness and the like around the host vehicle. That is, the target luminance values are set so that the front of the host vehicle is to be optimally bright in each of the city and the suburbs or in the daytime, at the evening and at night. The illuminance setting unit 42 may be configured to set the target luminance values of the individual areas R to be different, except the specific individual area R1.

The light source control unit 20 is configured to control the light source unit 10 based on the illuminance values set by the illuminance setting unit 42. The light source control unit 20 is configured to control turning on/off of the light source 22 and on/off switching of each mirror element 30. The light source control unit 20 is configured to adjust a time ratio (width or frequently) of the on-state of each mirror element 30, based on the illuminance value of the light to be radiated to each individual area R. Thereby, the illuminance of the light to be radiated to each individual area R can be adjusted. The light source control unit 20 is configured to transmit a drive signal to the light source 22 and/or the light deflection device 26 every 0.1 to 5 ms, for example.

The light is radiated from the light source unit 10 based on the illuminance values set by the illuminance setting unit 42, and an actual luminance value of each individual area R is resultantly detected by the high-speed low-accuracy analysis unit 114. Then, the illuminance setting unit 42 is configured to again set an illuminance value based on the detection result.

By the above configurations, the vehicle lamp system 1 can form a light distribution pattern including a plurality of partial illumination areas. Each of the plurality of partial illumination areas is formed when the corresponding mirror element 30 is on. The vehicle lamp system 1 can form various light distribution patterns by switching the on/off states of the respective mirror elements 30.

The vehicle lamp system 1 is configured to execute an ADB (Adaptive Driving Beam) control of forming an optimal light distribution pattern according to a position of the specific target object ahead of the host vehicle. For example, the illuminance setting unit 42 sets the specific target luminance value "0" for the specific individual area R1 to be determined according to a position where the oncoming vehicle 100 is present, and sets the target luminance value "1" for the other individual areas R. This setting is referred to as first luminance information. The illuminance setting unit 42 sets the target luminance value "2" for all the individual areas R according to the constant luminance control. This setting is referred to as second luminance information. Then, the illuminance setting unit 42 performs an AND operation for the first luminance information and the second luminance information. Thereby, luminance information in which the specific target luminance value "0" is set for the specific individual area R1 and the target luminance value "2" is set for the other individual areas R is generated.

Then, the illuminance setting unit 42 sets the illuminance value "0" for the specific individual area R1 for which the specific target luminance value "0" is set. That is, the light to the specific individual area R1 is shielded. The luminance of the individual area R, in which an object such as a streetlamp configured to self-emit light exists, of the respective individual areas R except the specific individual area R1 does not have a difference from the target luminance value or is equal to or greater than the target luminance value. Therefore, the illuminance setting unit 42 sets the illuminance value "0" for the corresponding individual area R, and shields the light. Since the luminance of the individual area R, in which an object such as a road marker, a delineator, a reflection plate and the like having high light reflectivity exists, has a smaller difference from the target luminance value, as compared to the other individual areas R, a relatively small illuminance value is set for the corresponding individual area. That is, the light to the corresponding individual area R is reduced. In this way, the light distribution pattern of which the illuminance of each area is set is formed ahead of the host vehicle, so that the light is not radiated to a driver of the oncoming vehicle 100 and the individual areas R except the specific individual area R1 have the same brightness, as seen from a driver of the host vehicle or the imaging unit 12.

Figure 17A:
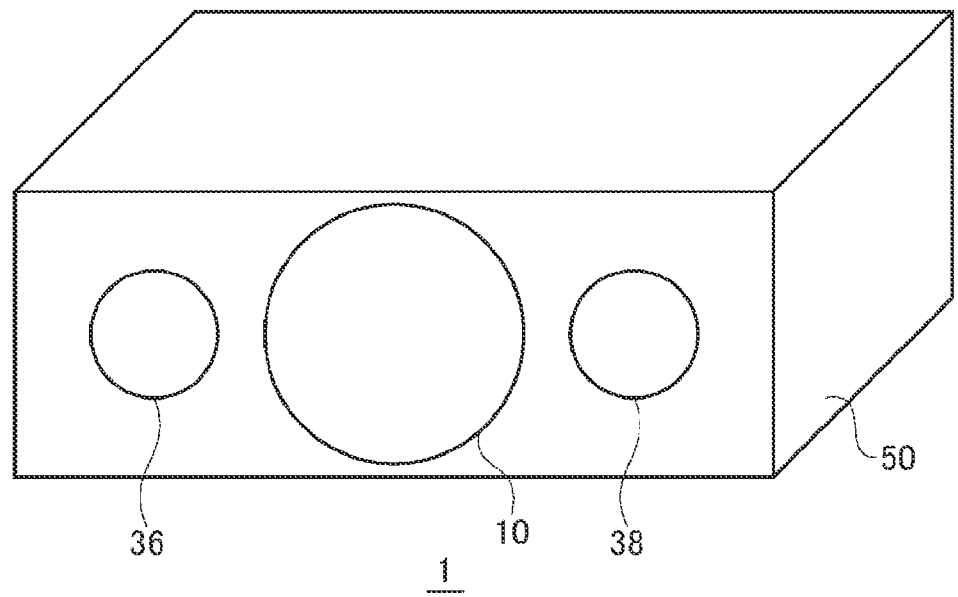
FIG. 17A is a perspective view schematically illustrating an outward appearance of the vehicle lamp system according to the sixth exemplary embodiment.
Figure 17B:
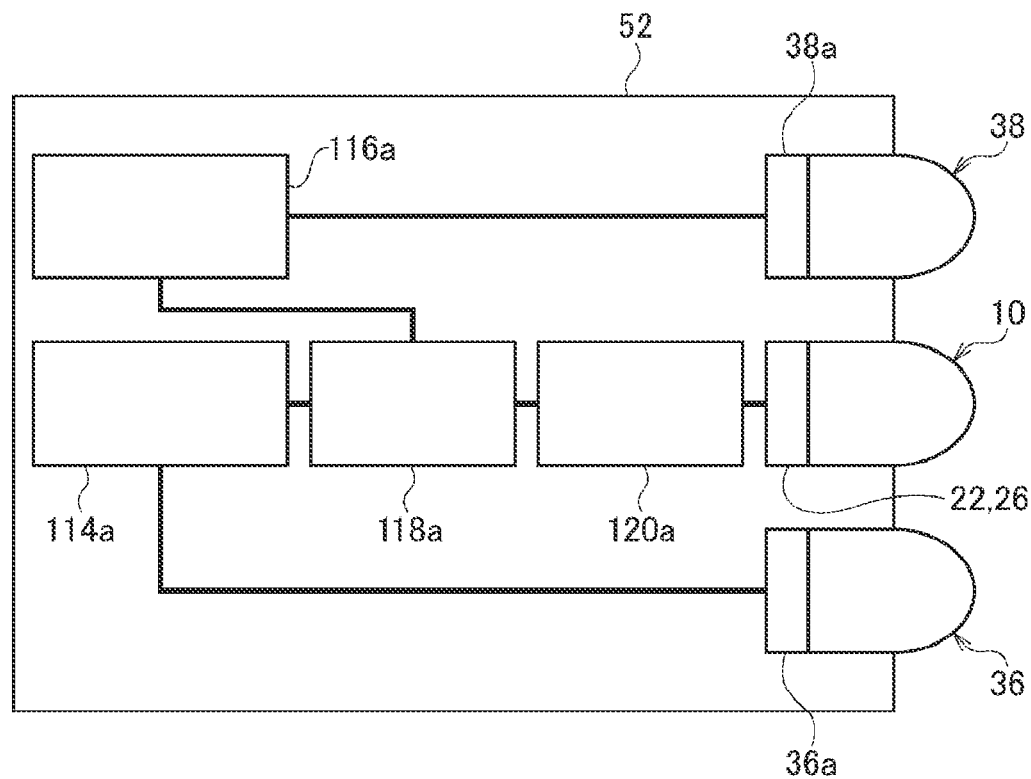
FIG. 17B is a plan view schematically illustrating an inside of a housing of the vehicle lamp system according to the sixth exemplary embodiment.

FIG. 17A is a perspective view schematically illustrating an outward appearance of the vehicle lamp system according to the sixth exemplary embodiment, and FIG. 17B is a plan view schematically illustrating an inside of a housing of the vehicle lamp system according to the sixth exemplary embodiment.

The vehicle lamp system 1 has a housing 50. In the housing 50, constitutional elements such as a wiring substrate 52, the light source unit 10 and the like are accommodated. The wiring substrate 52 is mounted thereon with at least an integrated circuit (hereinafter, appropriately referred to as fourth integrated circuit 114a) configuring the high-speed low-accuracy analysis unit 114 and an integrated circuit (hereinafter; appropriately referred to as fifth integrated circuit 118a) configuring the lamp control unit 18. That is, the fourth integrated circuit 114a and the fifth integrated circuit 118a are formed as one board. The fourth integrated circuit 114a and the fifth integrated circuit 118a are electrically connected to each other through a circuit wiring printed on the wiring substrate 52. Thereby, as compared to a configuration where the fourth integrated circuit 114a and the fifth integrated circuit 118a are mounted on separate substrates and are connected to each other by wires, it is possible to increase a communication speed therebetween. Also, it is possible to achieve the size reduction and cost reduction of the vehicle lamp system 1.

In the meantime, in the sixth exemplary embodiment, the tracking unit 40 and the illuminance setting unit 42 are configured by one integrated circuit (fifth integrated circuit 118a). However; an integrated circuit configuring the tracking unit 40 and an integrated circuit configuring the illuminance setting unit 42 may be separately provided.

In the sixth exemplary embodiment, the high-speed camera 36 is further mounted on the wiring substrate 52. That is, in addition to the fourth integrated circuit 114a and the fifth integrated circuit 118a, the high-speed camera 36 is also formed as one board. For example, an image sensor 36a (imager) of the high-speed camera 36 is mounted on the wiring substrate 52. The image sensor 36a is electrically connected to the fourth integrated circuit 114a through the circuit wiring printed on the wiring substrate 52. Thereby, it is possible to increase the communication speed between the fourth integrated circuit 114a configuring the high-speed low-accuracy analysis unit 114 and the high-speed camera 36. Also, it is possible to achieve the size reduction and cost reduction of the vehicle lamp system 1.

In the sixth exemplary embodiment, an integrated circuit (hereinafter; appropriately referred to as sixth integrated circuit 116a) configuring the low-speed high-accuracy analysis unit 116 is further mounted on the wiring substrate 52, That is, in addition to the fourth integrated circuit 114a, the fifth integrated circuit 118a and tire high-speed camera 36, the sixth integrated circuit 116a is also formed as one board. The sixth integrated circuit 116a is electrically connected to the fifth integrated circuit 118a through the circuit wiring printed on the wiring substrate 52. Thereby, it is possible to increase the communication speed between the fifth integrated circuit 118a configuring the tracking unit 40 and the illuminance setting unit 42 and the sixth integrated circuit 1116a configuring the low-speed high-accuracy analysis unit 116. Also, it is possible to achieve the size reduction and cost reduction of the vehicle lamp system 1.

In the sixth exemplary embodiment, the low-speed camera 38 is further mounted on the wiring substrate 52. That is, in addition to the fourth integrated circuit 114a, the fifth integrated circuit 118a, the high-speed camera 36 and the sixth integrated circuit 116a, the low-speed camera 38 is also formed as one board. For example, an image sensor 38a (imager) of the low-speed camera 38 is mounted on the wiring substrate 52. The image sensor 38a is electrically connected to the sixth integrated circuit 116a through the circuit wiring printed on the wiring substrate 52. Thereby, it is possible to increase the communication speed between the sixth integrated circuit 116a, configuring the low-speed high-accuracy analysis unit 116 and the low-speed camera 38. Also, it is possible to achieve the size reduction and cost reduction of the vehicle lamp system 1.

In the sixth exemplary embodiment, an integrated circuit (hereinafter, appropriately referred to as seventh integrated circuit 120a) configuring the light source control unit 20 is further mounted on the wiring substrate 52. That is, in addition to the fourth integrated circuit 114a, the fifth integrated circuit 118a, the high-speed camera 36, the sixth integrated circuit 116a and the low-speed camera 38, the seventh integrated circuit 120a is also formed as one board. The seventh integrated circuit 120a is electrically connected to the fifth integrated circuit 118a through the circuit wiring printed on the wiring substrate 52. Thereby, it is possible to increase the communication speed between the fifth integrated circuit 118a configuring the tracking unit 40 and the illuminance setting unit 42 and the seventh integrated circuit 120a configuring the light source control unit 20. Also, it is possible to achieve the size reduction and cost reduction of the vehicle lamp system 1.

In the sixth exemplary embodiment, the light source unit 10 is further mounted on the wiring substrate 52. That is, in addition to the fourth integrated circuit 114a, the fifth integrated circuit 118a, the high-speed camera 36, the sixth integrated circuit 116a, the low-speed camera 38 and the seventh integrated circuit 120a, the light source unit 10 is also formed as one board. For example, the light source 22 and/or the light deflection device 26 of the light source unit 10 are mounted on the wiring substrate 52. The light source 22 and/or the light deflection device 26 are electrically connected to the seventh integrated circuit 120a through the circuit wiring printed on the wiring substrate 52. Thereby, it is possible to increase the communication speed between the seventh integrated circuit 120a configuring the light source control unit 20 and the light source unit 10. Also, it is possible to achieve the size reduction and cost reduction of the vehicle lamp system 1.

The housing 50 has openings at places corresponding to provision positions of the light source unit 10, the high-speed camera 36 and the low-speed camera 38. The light source unit 10, the high-speed camera 36 and the low-speed camera 38 are exposed to an outside of the housing 50 through the openings.

The high-speed low-accuracy analysis unit 114 is configured by a parallel processing computing device, and the low-speed high-accuracy analysis unit 116 is configured by a sequential processing computing device. In this way, the computing devices appropriate to the image processing in the high-speed low-accuracy analysis unit 114 and the image processing in the low-speed high-accuracy analysis unit 116 are used, so that it is possible to increase the image processing speed in each unit.

The tracking unit 40 and the illuminance setting unit 42 are configured by a parallel processing computing device. In this way, the computation device appropriate to the processing that is executed in the tracking unit 40 and the illuminance setting unit 42 is used, so that it is possible to increase the processing speed in the tracking unit 40 and the illuminance setting unit 42. That is, the computation device is properly used depending on the processing that is executed in each unit, so that it is possible to improve the efficiency of the vehicle lamp system 1.

The parallel processing computing device includes one or more integrated circuits selected from a group consisting of an FPGA (field-programmable gate array), an ASIC (application specific integrated circuit) and a SoC (System-on-a-chip). The sequential processing computing device includes one or more integrated circuits selected from a group consisting of a CPU (Central Processing Unit) and a microcontroller. That is, the fourth integrated circuit 114a and the fifth integrated circuit 118a are respectively configured by the FPGA, the ASIC or the SoC. The sixth integrated circuit 116a is configured by the CPU or the microcontroller.

FIG. 5A and FIG. 5B are flowcharts illustrating an example of the ADB control that is executed in the vehicle lamp system according to the sixth exemplary embodiment. FIG. 6A and FIG. 6B are flowcharts illustrating another example of the ADB control that is executed in the vehicle lamp system according to the sixth exemplary embodiment. These flows are as described in the first exemplary embodiment, except that the luminance analysis unit 14 and the target analysis unit 16 are respectively interpreted as the high-speed low-accuracy analysis unit 114 and the low-speed high-accuracy analysis unit 116.

As described above, the vehicle lamp system 1 according to the sixth exemplary embodiment includes the light source unit 10, the imaging unit 12, the high-speed low-accuracy analysis unit 114, the low-speed high-accuracy analysis unit 116, the tracking unit 40, the illuminance selling unit 42, the light source control unit 20, and the wiring substrate 52. The light source unit 10 can individually adjust the illuminance of the light to be radiated to each of the plurality of individual areas R. The high-speed low-accuracy analysis unit 114 is configured to detect the luminance of each individual area R. The low-speed high-accuracy analysis unit 116 is configured to detect the target objects ahead of the host vehicle. The tracking unit 40 is configured to determine the specific target object from the target objects detected by the low-speed high-accuracy analysis unit 116 and to detect the displacement of the specific target object based on the detection result of the high-speed low-accuracy analysis unit 114. The illuminance setting unit 42 is configured to set the target luminance value of each individual area R, which includes the specific target luminance value for the specific individual area R1 determined according to a position where the specific target object is present, based on the detection result of the high-speed low-accuracy analysis unit 114 and the detection result of the tracking unit 40. The illuminance setting unit 42 is configured to set the illuminance value of the light to be radiated from the light source unit 10 to each individual area R. The light source control unit 20 is configured to control the light source unit 10 based on the illuminance values set by the illuminance setting unit 42.

The low-speed high-accuracy analysis unit 116 can detect the target objects with high accuracy. However; since a relatively long time is required for image processing, the analysis speed is slow. Therefore, if the ADB control is executed based on only the analysis result of the low-speed high-accuracy analysis unit 116, when the specific target object is the oncoming vehicle 100, for example, it is possible to form a light distribution pattern where a light shield area is narrowed and visibility of a driver of the host vehicle is improved. However, it is difficult to make the light shield area follow up the displacement of the oncoming vehicle 100 with high accuracy.

In the meantime, since the high-speed low-accuracy analysis unit 114 configured to execute simple luminance detection requires a relatively short time for image processing, it is possible to perform high-speed analysis. However, since the target detection accuracy is low, it is difficult to correctly recognize a presence position of the target object. Therefore, if the ADB control is executed based on only the analysis result of the high-speed low-accuracy analysis unit 114, it is necessary to set a wide light shield area of the light distribution pattern, which costs the visibility of the driver of the host vehicle.

In contrast, according to the vehicle lamp system 1 of the sixth exemplary embodiment, a position where the oncoming vehicle 100 is present is recognized with high accuracy and the light distribution pattern is determined by the combination of the low-speed high-accuracy analysis unit 116, which is a low-speed advanced image analysis means, and the high-speed low-accuracy analysis unit 114, which is a simple high-speed image analysis means. Therefore, it is possible to improve the radiation accuracy of light in the vehicle lamp 2, in other words, the formation accuracy of the light distribution pattern. As a result, it is possible to realize both the avoidance of the glare to the driver of the oncoming vehicle 100 and the visibility of the driver of the host vehicle in a higher level.

The wiring substrate 52 is mounted thereon with the fourth integrated circuit 114a configuring the high-speed low-accuracy analysis unit 114 and the fifth integrated circuit 118a configuring the tracking unit 40 and the illuminance setting unit 42. Thereby, it is possible to increase the communication speed between the fourth integrated circuit 114*a* and the fifth integrated circuit 118*a*. Therefore, it is possible to improve the radiation accuracy of light in the vehicle lamp 2, Also, it is possible to achieve the size reduction and cost reduction of the vehicle lamp system 1.

The imaging unit 12 of the sixth exemplary embodiment includes the high-speed camera 36 and the low-speed camera 38. The high-speed low-accuracy analysis unit 114 is configured to detect the luminance based on the information obtained from the high-speed camera 36, and the low-speed high-accuracy analysis unit 116 is configured to detect the target objects based on the information obtained from the low-speed camera 38. In this way, the cameras are respectively allotted to the high-speed low-accuracy analysis unit 114 and the low-speed high-accuracy analysis unit 116, so that it is possible to adopt the dedicated camera for performance required for each image analysis. In general, a camera having performances required for the image analyses of the high-speed low-accuracy analysis unit 114 and the low-speed high-accuracy analysis unit 116 is expensive. Therefore, according to the sixth exemplary embodiment, it is possible to reduce the costs of the imaging unit 12 and the vehicle lamp system 1.

In the sixth exemplary embodiment, the high-speed camera 36 is further mounted on the wiring substrate 52. Thereby, it is possible to increase the communication speed between the fourth integrated circuit 114*a* configuring the high-speed low-accuracy analysis unit 114 and the high-speed camera 36. Therefore, it is possible to further improve the radiation accuracy of light in the vehicle lamp 2. Also, it is possible to achieve the size reduction and cost reduction of the vehicle lamp system 1.

In the sixth exemplary embodiment, the sixth integrated circuit 116*a* configuring the low-speed high-accuracy analysis unit 116 is further mounted on the wiring substrate 52. Thereby, it is possible to increase the communication speed between the fifth integrated circuit 118*a* configuring the tracking unit 40 and the illuminance setting unit 42 and the sixth integrated circuit 116*a* configuring the low-speed high-accuracy analysis unit 116. Therefore, it is possible to further improve the radiation accuracy of light in the vehicle lamp 2. Also, it is possible to achieve the size reduction and cost reduction of the vehicle lamp system 1.

In the sixth exemplary embodiment, the low-speed camera 38 is further mounted on the wiring substrate 52. Thereby, it is possible to increase the communication speed between the sixth integrated circuit 116*a* configuring the low-speed high-accuracy analysis unit 116 and the low-speed camera 38. Therefore, it is possible to further improve the radiation accuracy of light in the vehicle lamp 2. Also, it is possible to achieve the size reduction and cost reduction of the vehicle lamp system 1.

In the sixth exemplary embodiment, the seventh integrated circuit 120*a* configuring the light source control unit 20 is further mounted on the wiring substrate 52. Thereby, it is possible to increase the communication speed between the fifth integrated circuit 118*a* configuring the tracking unit 40 and the illuminance setting unit 42 and the seventh integrated circuit 120*a* configuring the light source control unit 20. Therefore, it is possible to further improve the radiation accuracy of light in the vehicle lamp 2. Also, it is possible to achieve the size reduction and cost reduction of the vehicle lamp system 1.

In the sixth exemplary embodiment, the light source unit 10 is further mounted on the wiring substrate 52. Thereby, it is possible to increase the communication speed between the seventh integrated circuit 120*a* configuring the light source control unit 20 and the light source unit 10. Therefore, it is possible to further improve the radiation accuracy of light in the vehicle lamp 2. Also, it is possible to achieve the size reduction and cost reduction of the vehicle lamp system 1.

In the sixth exemplary embodiment, the high-speed low-accuracy analysis unit 114 is configured by the parallel processing computing device, and the low-speed high-accuracy analysis unit 116 is configured by the sequential processing computing device. Thereby, since it is possible to accelerate the computation processing in the vehicle lamp system 1, it is possible to improve the radiation accuracy of light in the vehicle lamp 2.

In the sixth exemplary embodiment, the tracking unit 40 and the illuminance setting unit 42 are configured by the parallel processing computing device. Thereby, since it is possible to accelerate the computation processing in the vehicle lamp system 1, it is possible to improve the radiation accuracy of light in the vehicle lamp 2.

The present invention is not limited to the respective exemplary embodiments and can be variously modified such as various design changes by combinations of the respective exemplary embodiments or based on the knowledge of one skilled in the art, and the new exemplary embodiments obtained by the combinations of the respective exemplary embodiments or modifications are also included within the scope of the present invention. The new exemplary embodiments achieve the effects of the combined exemplary embodiments and modifications.

In the first to fourth exemplary embodiments, the imaging unit 12, the luminance analysis unit 14, the target analysis unit 16, the lamp control unit 18 and the light source control unit 20 are provided inside the lamp chamber 8 but may be respectively provided outside the lamp chamber 8. Similarly, in the fifth exemplary embodiment, the imaging unit 12, the high-speed low-accuracy analysis unit 114, the low-speed high-accuracy analysis unit 116, the lamp control unit 18 and the light source control unit 20 are provided inside the lamp chanter 8 but may be respectively provided outside the lamp chamber 8. For example, as the low-speed camera 38 of the imaging unit 12, an existing camera mounted in the vehicle interior may be used. In the meantime, angles of view of the imaging unit 12 and the light source unit 10 preferably coincide with each other.

When the high-speed camera 36 has a resolution equivalent to the low-speed camera 38, the low-speed camera 38 may be omitted. Thereby, it is possible to achieve the size reduction of the vehicle lamp system 1. In this case, the target analysis unit 16 is configured to detect the target objects by using the image data of the high-speed camera 36. Similarly, the low-speed high-accuracy analysis unit 116 is configured to detect the target objects by using the image data of the high-speed camera 36.

In the second to sixth exemplary embodiments, the specific target object may be the pedestrian 200. In this case, the specific target luminance value of the specific individual area R1 is set as a value greater than those of the other individual areas R. Thereby, it is possible to radiate the light having higher illuminance to the pedestrian 200, thereby allowing the driver of the host vehicle to easily recognize the pedestrian 200. The tracking unit 40 can detect a position of the pedestrian 200 by implementing the known image processing such as edge enhancement for the luminance data of each individual area R, which is the detection result of the luminance analysis unit 14 or the high-speed low-accuracy analysis unit 114. The edge enhancement may be included in the processing of the luminance analysis unit 14 or the high-speed low-accuracy analysis unit 114.

In the respective exemplary embodiments, the light source unit 10 may include a scan optical system configured to scan an area ahead of the host vehicle with the source light or an LED array in which LEDs corresponding to the respective individual areas R are aligned, instead of the light deflection device 26 that is the DMD.

In the fifth exemplary embodiment, the illuminance setting unit 42 may be configured to set the target luminance values of the individual areas R to be different, except the specific individual area R1. The number of switching steps of α and/or β may be a preset fixed value. Also, α and/or β may be preset fixed values. By the configurations, it is possible to simplify the control.

In the sixth exemplary embodiment, in addition to the fourth integrated circuit 114*a* configuring the high-speed low-accuracy analysis unit 114 and the fifth integrated circuit 118*a* configuring the lamp control unit 18, the high-speed camera 36, the sixth integrated circuit 116*a* configuring the low-speed high-accuracy analysis unit 116, the low-speed camera 38, the seventh integrated circuit 120*a* configuring the light source control unit 20 and the light source unit 10 are also mounted on the same wiring substrate 52. However, the present invention is not particularly limited to the configuration, and the cameras and the integrated circuits except the fourth integrated circuit 114*a* and the fifth integrated circuit 118*a* may be mounted on a separate wiring substrate.

When the light source unit 10 is not formed as one board, the imaging unit 12, the high-speed low-accuracy analysis unit 114, the low-speed high-accuracy analysis unit 116, the lamp control unit 18 and the light source control unit 20 may be appropriately provided outside the lamp chamber S. For example, as the low-speed camera 38 of the imaging unit 12, an existing camera mounted in the vehicle interior may be used. In the meantime, the imaging unit 12 and the light source unit 10 are preferably mounted on the same substrate. Thereby, it is possible to easily match the angles of view of the imaging unit 12 and the light source unit 10.

Figure 18:
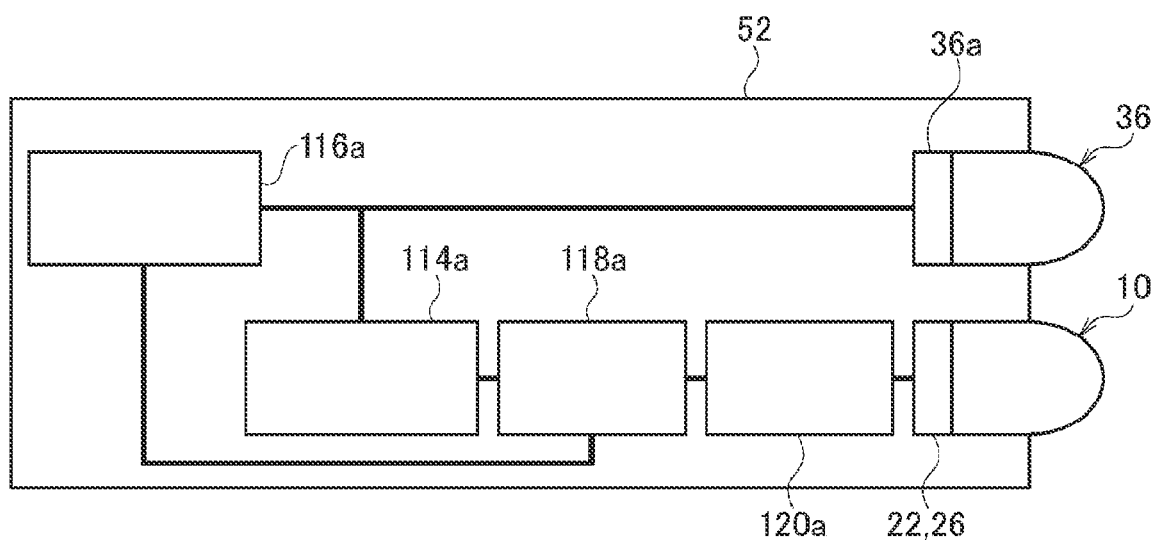
FIG. 18 is a plan view schematically illustrating an inside of a housing of a modified embodiment of the vehicle lamp system according to the sixth exemplary embodiment.

As shown in FIG. 18, when the high-speed camera 36 has a resolution equivalent to the low-speed camera 38, the low-speed camera 38 may be omitted. FIG. 18 is a plan view schematically illustrating an inside of a housing of a modified embodiment of the vehicle lamp system according to the sixth exemplary embodiment. In the vehicle lamp system of the modified embodiment, the image sensor 36*a* of the high-speed camera 36 is electrically connected to the fourth integrated circuit 114*a* configuring the high-speed low-accuracy analysis unit 114 and the sixth integrated circuit 116*a* configuring the low-speed high-accuracy analysis unit 116, The low-speed high-accuracy analysis unit 116 is configured to detect the target objects by using the image data of the high-speed camera 36. According to the modified embodiment, it is possible to further downsize the vehicle lamp system 1.

In the fifth and sixth exemplary embodiments, it is possible to execute the constant luminance control and the high contrast control. The relations between the detected luminance value and the set illuminance value, which are shown in FIGS. 13A to 13C and 14A to 14C, may be applied.

REFERENCE SIGNS LIST

1: vehicle lamp system, vehicle lamp, 10: light source unit. 12: imaging unit, 14: luminance analysis unit, 16: target analysis unit, 20: light source control unit. 36: high-speed camera, 38: low-speed camera, 40: tracking unit, 42: illuminance setting unit, 52: wiring substrate, 114: high-speed low-accuracy analysis unit, 116: low-speed high-accuracy analysis unit, R: individual area, R1: specific individual area One or more embodiments of the present invention relates to the vehicle lamp system, the vehicle lamp control device and the vehicle lamp control method, and particularly, to the vehicle lamp system, the vehicle lamp control device and the vehicle lamp control method to be used for an automobile and the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle lamp control device comprising:
an imaging unit configured to take an image ahead of a host vehicle;
a target analysis unit configured to detect target objects ahead of the host vehicle based on information obtained from the imaging unit;
a tracking unit configured to repeatedly determine a specific target object from the target objects detected by the target analysis unit and to repeatedly detect displacement of the specific target object based on a detection result of a luminance analysis unit configured to detect luminance of each of a plurality of individual areas ahead of the host vehicle based on the information obtained from the imaging unit; and
a pattern formation control unit configured to determine a formation range of a luminance-dependent light distribution pattern in which illuminance values are set depending on the luminances detected by the luminance analysis unit, and a formation range of a luminance-independent light distribution pattern in which illuminance values are set independently of the luminances detected by the luminance analysis unit,
wherein position information of a specific individual area corresponding to a position of the specific target object is updated based on the repeatedly detected displacement,
wherein a light distribution pattern to be formed by a light source unit of a vehicle lamp is determined based on the detection result of the luminance analysis unit and a detection result of the tracking unit, and
wherein the pattern formation control unit, based on a detection result of the luminance analysis unit, sets an area having a high possibility that a target object to be recognized will exist therein, as the formation range of the luminance-dependent light distribution pattern, and sets an area having a low possibility that a target object to be recognized will exist therein, as the formation range of the luminance-independent light distribution pattern.

2. The vehicle lamp control device according to claim 1, wherein the luminance analysis unit is configured to detect the luminance based on information obtained from a high-speed camera included in the imaging unit, and
wherein the target analysis unit is configured to detect the target objects based on information obtained from a low-speed camera included in the imaging unit.

3. The vehicle lamp control device according to claim 1, further comprising:
an illuminance setting unit configured to set, based on the detection result of the luminance analysis unit and the detection result of the tracking unit, an illuminance value of light to be radiated to each individual area, which includes a specific illuminance value for the specific individual area determined according to a position where the specific target object is present;
wherein the illuminance setting unit is configured to:
set a target luminance value of each individual area and set the illuminance value based on the target luminance value; and
set the same target luminance value for individual areas, of which luminances detected by the luminance analysis unit are within a predetermined range, of the individual areas except the specific individual area.

4. The vehicle lamp control device according to claim 1, wherein the illuminance setting unit is configured to set a relatively low illuminance value for an individual area of which the detected luminance is relatively low and to set a relatively high illuminance value for an individual area of which the detected luminance is relatively high, in individual areas, of which luminances detected by the luminance analysis unit are within a predetermined range, of the individual areas except the specific individual area.

5. The vehicle lamp control device according to claim 1, further comprising:
a first integrated circuit configured to execute processing of setting the specific illuminance value for the specific individual area; and
a second integrated circuit configured to execute processing of setting the illuminance value of each individual area depending on luminances detected by the luminance analysis unit.

6. The vehicle lamp control device according to claim 1, further comprising: a first integrated circuit configured to execute processing of setting the specific illuminance value for the specific individual area; a second integrated circuit configured to execute processing of setting the illuminance values for a part of the individual areas depending on the luminances detected by the luminance analysis unit; and a third integrated circuit configured to execute processing of setting the illuminance values for another part of the individual areas, independently of the luminances detected by the luminance analysis unit.

7. A vehicle lamp system comprising:
a vehicle lamp control device according to claim 1, the control device including:
an illuminance setting unit configured to set, based on the detection result of the luminance analysis unit and a detection result of the tracking unit, an illuminance value of light to be radiated to each individual area, which includes a specific illuminance value for the specific individual area determined according to a position where the specific target object is present;
a high-speed low-accuracy analysis unit configured to detect luminance of each individual area based on information obtained from the imaging unit;
a low-speed high-accuracy analysis unit configured to detect target objects ahead of the host vehicle based on the information obtained from the imaging unit; and
a light source control unit configured to control the light source unit based on the illuminance values set by the illuminance setting unit,
wherein the high-speed low-accuracy analysis unit is configured by a parallel processing computing device, and
wherein the low-speed high-accuracy analysis unit is configured by a sequential processing computing device.

8. The vehicle lamp system according to claim 7, wherein the tracking unit and the illuminance setting unit are configured by a parallel processing computing device.

9. The vehicle lamp system according to claim 7, wherein the parallel processing computing device includes one or more integrated circuits selected from a group consisting of an FPGA, an ASIC and a SoC, and
wherein the sequential processing computing device includes one or more integrated circuits selected from a group consisting of a CPU and a microcontroller.

10. The vehicle lamp system according to claim 8, wherein the parallel processing computing device includes one or more integrated circuits selected from a group consisting of an FPGA, an ASIC and a SoC, and
wherein the sequential processing computing device includes one or more integrated circuits selected from a group consisting of a CPU and a microcontroller.

* * * * *